United States Patent
Mochizuki et al.

[11] Patent Number: 6,122,166
[45] Date of Patent: Sep. 19, 2000

[54] PERSONAL COMPUTER COOLING DEVICE HAVING HINGED HEAT PIPE

[75] Inventors: Masataka Mochizuki, Nagareyama; Yuji Saito; Masashi Hasegawa, both of Tokyo; Motoyuki Ono, Sakura, all of Japan

[73] Assignee: Fujikura Ltd., Tokyo, Japan

[21] Appl. No.: 08/980,341

[22] Filed: Nov. 28, 1997

Related U.S. Application Data

[62] Division of application No. 08/527,333, Sep. 12, 1995.

[30] Foreign Application Priority Data

| | | | | |
|---|---|---|---|---|
| Sep. 16, 1994 | [JP] | Japan | ................................. | 6-248877 |
| Nov. 9, 1994 | [JP] | Japan | ................................. | 6-300341 |
| Apr. 28, 1995 | [JP] | Japan | ................................. | 7-129084 |
| Apr. 28, 1995 | [JP] | Japan | ................................. | 7-129085 |
| May 2, 1995 | [JP] | Japan | ................................. | 7-132947 |
| Jun. 30, 1995 | [JP] | Japan | ................................. | 7-188694 |

[51] Int. Cl.$^7$ ............................... G06F 1/20; H05K 7/20
[52] U.S. Cl. .................... 361/687; 174/15.2; 165/104.33
[58] Field of Search ........................ 364/708.1; 361/687, 361/699, 700, 704, 707; 174/15.2; 165/80.4, 104.33, 104.21; 62/259.2

[56] References Cited

U.S. PATENT DOCUMENTS

| | | | |
|---|---|---|---|
| 4,109,709 | 8/1978 | Honda et al. . | |
| 4,394,344 | 7/1983 | Werner et al. . | |
| 4,966,226 | 10/1990 | Hamburgen . | |
| 5,237,486 | 8/1993 | Lapoint et al. . | |
| 5,313,362 | 5/1994 | Hatada et al. | ................. 361/687 X |
| 5,331,510 | 7/1994 | Ouchi et al. . | |
| 5,339,214 | 8/1994 | Nelson . | |
| 5,383,340 | 1/1995 | Larson et al. | ................. 361/700 X |
| 5,394,936 | 3/1995 | Budelman . | |
| 5,430,609 | 7/1995 | Kikinis | ................................. 361/687 |
| 5,555,487 | 9/1996 | Katoh et al. | ............................. 361/680 |
| 5,621,613 | 4/1997 | Haley et al. | ............................. 361/687 |
| 5,646,822 | 7/1997 | Bhatia et al. | ............................ 361/687 |

FOREIGN PATENT DOCUMENTS

| | | |
|---|---|---|
| 25 15 753 | 10/1976 | Germany . |
| 42 17 431 | 12/1992 | Germany . |

OTHER PUBLICATIONS

Patent Abstracts of Japan, vol. 10, No. 42, Feb. 19, 1986, JP–60–198848, Oct. 8, 1985.
Byte, vol. 19, No. 2, p. 32, Feb. 1994, Nicholas Baran, "Liquid–Cooled PCS: The Next Hot Thing?".
Machine Design, vol. 64, No. 11, Jun. 11, 1992, "Liquid Heat Sink Cools Military Computer", p. 42.
Institute of Electrical and Electronics Engineers, pp. 147–152, Oct. 14, 1991, Robert Levasseur, "Liquid Cooled Approaches for High Density Avionics".
Byte, vol. 19, No. 2, p. 32, Feb. 1994, Nicholas Baran, "Liquid–Cooled PCs: The Next Hot Thing~".
Jyu–Yu Sun et al. "The Development of Flat Plate Heat Pipes for Electronic Cooling." Proceedings of Fourth International Heat Pipe Symposium at University of Tsukuba on May 16–18, 1994., pp. 121–131.

*Primary Examiner*—Lynn D. Feild
*Attorney, Agent, or Firm*—Oblon, Spivak, McClelland, Maier & Neustadt, P.C.

[57] ABSTRACT

A device for cooling a personal computer including: a body having a heat generating electronic element therein; and a keyboard section connected in an openable manner to the personal computer body through a hinge. A first heat pipe, which has its one end portion connected to the electronic element in a heat transferring manner, and a second heat pipe, which has its one end portion arranged along an electromagnetic insulating plate mounted in the keyboard section, are connected through the hinge in a manner to rotate relative to each other and in a heat transferring manner.

1 Claim, 21 Drawing Sheets

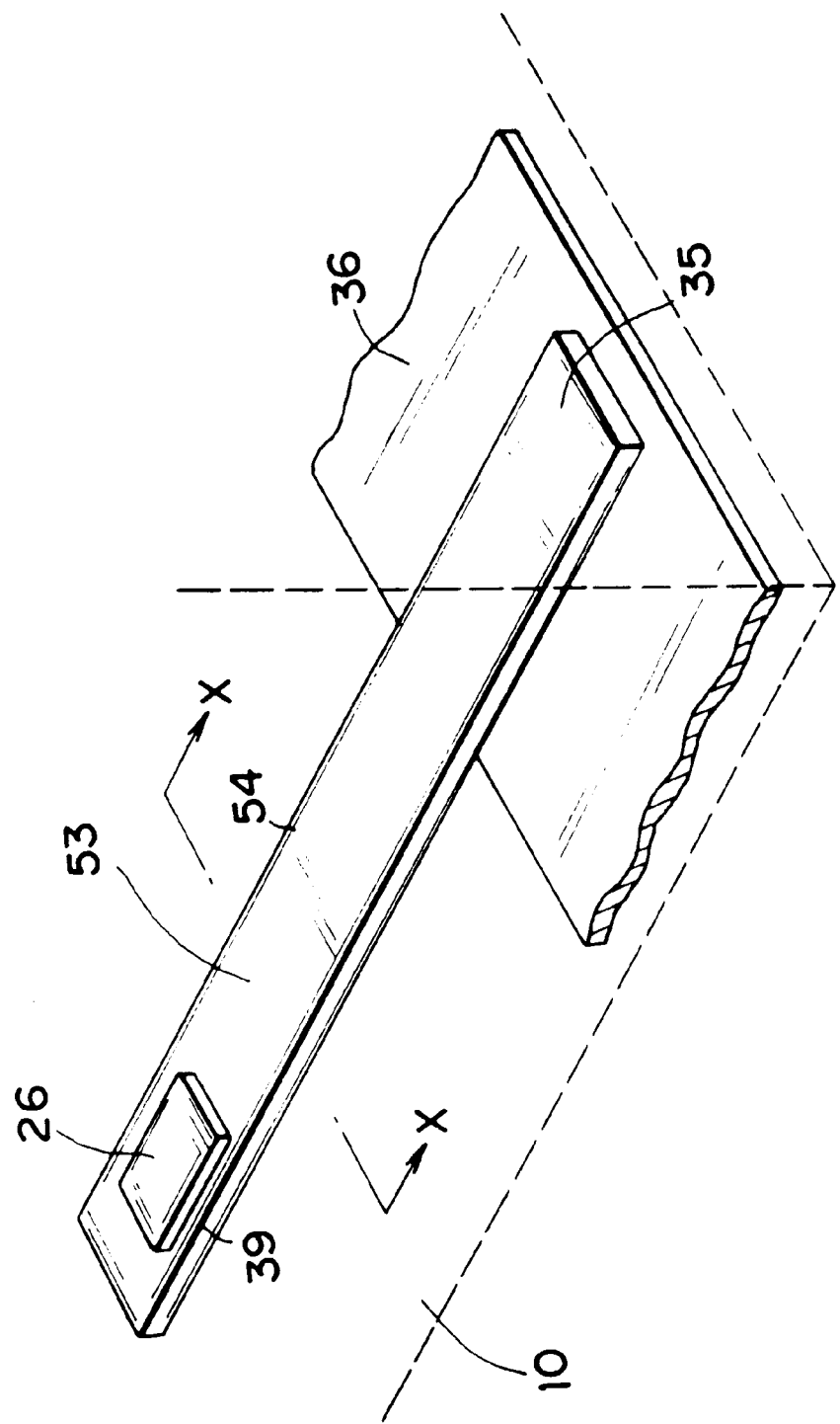

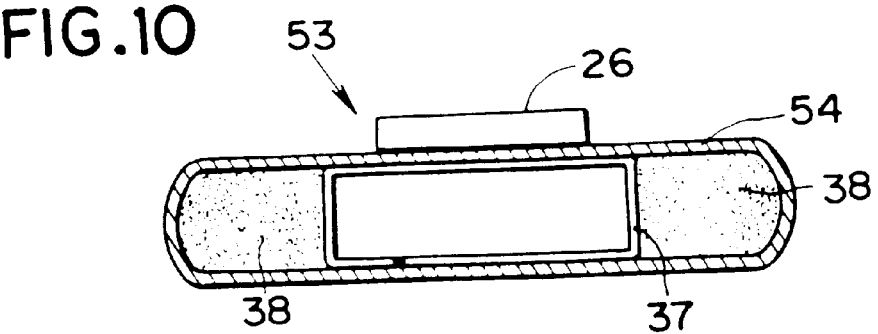
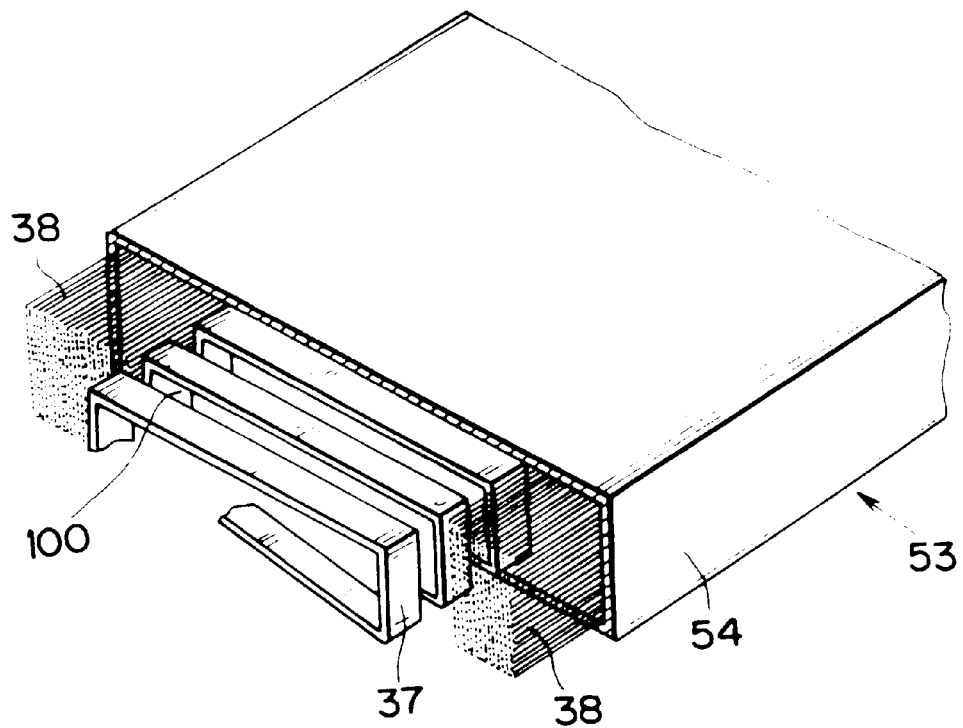

PERSONAL COMPUTER COOLING DEVICE HAVING HINGED HEAT PIPE

This is a Division of application Ser. No. 08/527,333 filed on Sep. 12, 1995.

BACKGROUND OF THE INVENTION

1. Field of the Invention

The present invention relates to a personal computer cooling device for cooling an electronic element such as a processing unit of a personal computer by means of a heat pipe for transmitting the heat as the latent heat of a working fluid, and a process for manufacturing a container for the heat pipe.

2. Related Art

In recent years, a variety of personal computers have been desired to have their sizes and weights reduced. These reductions have seriously limited such a space in the personal computer as to be occupied by the cooling device. On the other hand, the output of the processing unit is augmented year by year as the number of functions is increased and as the processing speed is improved. In the prior art, heat pipes having an excellent heat transmission capacity have been noted as the cooling device. Of these, a plate heat pipe having a flattened container is widely adopted because it satisfies the conditions for the contact with the processing unit and the saving of space.

One example of the personal computer cooling device of the prior art is shown in FIGS. 33 and 34. In FIG. 33, a personal computer body 1 is a relatively thin, rectangular box made of a plastic panel or a metal panel and given a size of about A5 to A4 according to the JIS (i.e., Japanese Industrial Standard). The personal computer body 1 is equipped on its upper face with a keyboard section 2 and a display section 3. These keyboard section 2 and the display section 3 are individually hinged, as indicated at 2a and 3a, to the personal computer body 1. In other words, the keyboard section 2 and the display section 3 can be turned up from and down to the personal computer body 1. Moreover, these keyboard and display sections 2 and 3 are individually equipped with electromagnetic insulating plates 4 having equal sizes. These electromagnetic insulating plates 4 are made of an aluminum sheet.

In the front half (as located at the side of the keyboard section 2 in FIG. 33) of the space in the personal computer body 1, there are mounted a detachable hard disk drive 5, a floppy disk drive, a battery, an add-in memory (although all of them are not shown) and so on. In the bottom of the other half space of the personal computer body 1, on the other hand, there is arranged a heat pipe 6. Over this heat pipe 6, there is laid through a heat transmission promoting compound a central processing unit (as will be shortly referred to as the "CPU") 7, which in turn are overlaid by a plurality of printed circuits 8.

The aforementioned heat pipe 6 is a plate heat pipe having a flattened hollow container which is equipped on its portion with a plurality of rectangular fins 9 for retaining the heat radiating area. Moreover, the container of this heat pipe 6 is formed in its wall face with a plurality of (not-shown) grooves which extend in the longitudinal direction to act as wicks.

In the cooling device thus constructed, the working fluid in the heat pipe 6 is evaporated by the heat which is generated from the CPU 7 as the personal computer is used, and the vapor flows to such a portion of the container at the side of the fins 9 as has a lower temperature. The vapor of the working fluid is condensed because its heat is taken by the atmosphere. Specifically, the heat of the CPU 7 is delivered by the working fluid of the heat pipe 6 until it is radiated from the fins 9. As a result, the temperature of the CPU 7 is suppressed within an allowable range. Incidentally, the working fluid thus condensed into liquid phase is sucked by the capillary pressure of the wick into the container inner wall at the evaporation side, where it is evaporated again.

Since the space in the personal computer provided for the heat pipe is seriously restricted, as described above, the heat pipe to be used has to be small in section. On the other hand, the heat radiating portion and the heat radiating portion are spaced at a distance so that the heat pipe has a considerable length, as compared with its sectional area (i.e., its effective area for the passage).

In view of this, according to the prior art, groove wicks are[]formed to establish a desired capillary pressure (or pumping action) while retaining the vapor passage. However, the capillary pressure to be established by the groove wicks is not high, but the reflux distance of the working fluid used in the personal computer cooling heat pipe is relatively long. Thus, the heat pipe 6 of the prior art may fail to achieve a necessary and sufficient cooling capacity. In case, more specifically, the heat flux is increased with the high power of the CPU 7, the pumping action for the working fluid in liquid phase may become insufficient to dry out and make the evaporation portion short of the working fluid.

Because of a small sectional area, as described above, the working liquid being returned is splashed out as the flow rate of the working fluid vapor rises. This splash may also make the evaporation portion short of the reflux of the working liquid. After all, the heat transfer characteristics may become too low to cool the CPU 7 sufficiently.

Moreover, the cooling capacity of the CPU 7 through the heat pipe 6 is restricted by the substantial area of heat radiation of the heat pipe 6. Since the cooling device of the prior art is constructed to retain the area of the heat radiating portion of the heat pipe 6 by the fins 9, the heat radiation area required of the heat pipe 6 increases with the rise of the output of the CPU 7 so that the size of the fins 9 has to be enlarged. Since, moreover, these fins 9 are disposed in the personal computer body 1, the space for the cooling device to occupy in the inside space of the personal computer body 1 is necessarily enlarged. This invites a disadvantage that the size of the personal computer body 1 is accordingly enlarged.

For manufacturing the aforementioned flattened heat pipe 6, on the other hand, not only a mass production is desired at a reasonable cost and at a high rate, but also a predetermined sectional shape (for the vapor passage) has to be retained. These requirements have not be satisfied by the process of the prior art.

Incidentally, the means known per se for grading up the functions of the personal computer is exemplified by replacing the display section 3. At this time, the display section 3 and the personal computer body 1 are naturally separated from each other. In the case of the aforementioned cooling device, the display section 3 is detached from the personal computer body 1 by disassembling the hinge 3a by means of a suitable tool. Thus, in the cooling device thus far described, it is not easy to remove the display section from the presomal computer body 1 and it has low detachability.

SUMMARY OF THE INVENTION

A main object of the present invention is to provide a personal computer cooling device which is excellent in the cooling capacity for an electronic element and compact in the entire structure.

Another object of the present invention is to provide a personal computer cooling device which is excellent in the detachability between the display section and the personal computer body and in the cooling capacity for the electronic element.

Still another object of the present invention is to provide a heat pipe for a personal computer cooling device, which can cool the electronic element efficiently.

A further object of the present invention is to provide a process for manufacturing a container for the heat pipe at a reasonable cost and at a high rate.

In order to achieve the above-specified objects, according to the present invention, a metal plate such as a noise insulating plate is arranged on the display section or keyboard section which is openably hinged to the personal computer body, and a processing unit is disposed as the electronic element in the personal computer body. Moreover, the processing unit is arranged in a heat transferring manner with one end portion of a first heat pipe, the other end portion of which is arranged coaxially with the center axis of the hinge, and the metal plate is arranged in a heat transferring manner with one end portion of a second heat pipe. The other end portion of this second heat pipe is arranged coaxially with the center axis of the hinge and connected to the first heat pipe in a heat transferring manner.

In this cooling device, the heat from the processing unit is transmitted to the one end portion of the first heat pipe so that the working fluid in that end portion is evaporated. This vapor of the working fluid flows to the other end portion, in which both the temperature and the internal pressure are low, so that it is condensed because its heat is taken by the one end portion of the second heat pipe. The working fluid thus having transferred its heat and liquefied is returned to the end portion at the side of the processing unit. In this meanwhile, the working fluid in the second heat pipe is evaporated by the heat which is transmitted from the first heat pipe. The resultant vapor flows to the end portion arranged at the side of the metal plate, so that it is condensed because its heat is taken by the end portion. In short, the heat, as generated from the processing unit, is transferred through the first heat pipe from the second heat pipe to the metal plate until it is radiated to the outside.

Thus, the metal plate acts as the heat radiating face of the second heat pipe. However, this metal plate is already present to require no additional space so that the entire structure can be made compact.

In this device, moreover, the first heat pipe and the second heat pipe have their individual one-end portions arranged coaxially with the center axis of the hinge so that the openable section such as the keyboard section or the display section can be turned (or opened/closed) without any trouble even if the second heat pipe is arranged on the metal plate.

In the cooling device of the present invention, furthermore, a metal block, which is detachably attached to at least either of the personal computer body and the display section and to which is connected the processing unit in a heat transferring manner, may be arranged with the one end portion of the heat pipe in a manner to turn on the turning center axis of the display section and in a heat transferring manner. Moreover, the other end portion of the heat pipe may be attached to that member of the display section, which is exposed to the outer face.

In this device, too, the display section can be opened from and closed to the personal computer body by the hinge. Especially in this device, the metal block can be detachably attached to at least either the personal computer body or the display section so that the personal computer body and the display section can be easily separated. If, in this case, the metal block is made detachable with respect to the personal computer body, this detachability is not deteriorated because the heat pipe of the display section is left on the metal block.

As the personal computer body is used, on the other hand, the heat, if generated from the processing unit, is transmitted through the metal block to the one end portion of the heat pipe. As a result, the end portion of the heat pipe, as arranged at the side of the metal block, takes a higher temperature than that of the end portion arranged at the side of the display section so that the heat pipe action for the heat source of the processing unit is started.

Specifically, the vapor of the working fluid flows in the container of the heat pipe from the end portion at the side of the metal block to the end portion at the side of the display section, in which it is condensed because its heat is taken. Thus, the end portion of the heat pipe for providing the condensation portion is united with that member of the display section, which is exposed to the outside, so that the heat radiated from the heat pipe is efficiently radiated to the atmosphere surrounding thy display section. As a result, the processing unit is efficiently cooled.

The heat pipe to be used in the present invention is a personal computer cooling flattened heat pipe which is arranged in the personal computer in a heat transferring manner between the electronic element or the heat generating portion and the heat radiating portion. In the container made of a closed flat metal pipe, there are longitudinally arranged wicks which are made of a number of extremely thin wires. Moreover, these wicks are fixed on the inner wall of the container by a fixing member. This fixing member is exemplified by a spiral member, which is spirally wound at an interval between the adjoining bands, a flattened cylindrical mesh member or a number of wires.

When the heat is transmitted from the electronic element to one end portion of the container of this plate heat pipe, the working fluid having wetted the inner wall of the container and the wicks is heated and evaporated. This vapor of the working fluid flows into the hollow portion in the fixing member and further to the other end portion of the container, as at a lower internal pressure, that is, to the end portion arranged at the side of the heat radiating portion. As a result, the vapor passage is provided in the fixing member. Moreover, the working fluid vapor leaks from the gap at the end portion of the fixing member to the inner wall of the container, so that it is condensed as its heat is taken by the inner wall.

The working fluid thus having restored the liquid phase is delivered to the evaporation portion of the container by the capillary pressure of the wicks. In this case, the wicks providing the liquid passage are arranged in the longitudinal direction of the container, and the effective capillary radius between the extremely thin wires constructing the wicks is so small as to establish a high pumping action. As a result, the working fluid is returned to the evaporation portion side even in a top heat mode. Moreover, no interference arises between the vapor flow and the liquid flow so that no splashing phenomenon occurs to improve the efficiency of the heat transmission.

According to a process for manufacturing the heat pipe for the personal computer cooling device, the fixing member is axially inserted into a plastically deformable pipe material having a circular section, and wicks of extremely thin wires are then inserted into the spaces between the inner wall of the pipe material and the fixing member. After this, the pipe material and the fixing member are collapsed radially of the pipe member into a flattened hollow shape. Since, at this time, the pipe member is supported from its inner side by the wound radial elasticity of the fixing member, the pipe member can be prevented from being longitudinally impressed at the widthwise center portions of its upper and lower faces.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 9 is a schematic perspective view showing a flat heat pipe disposed in the personal computer body according to the third embodiment;

FIG. 10 is a section taken along line X—X of FIG. 9 and shows the internal structure of a flat heat pipe according to a fourth embodiment of the present invention;

FIG. 11 is a partially cut-away perspective view showing an arranged state of wicks and a spiral member in a container according to the fourth embodiment;

DESCRIPTION OF THE PREFERRED EMBODIMENTS

Figure 1:
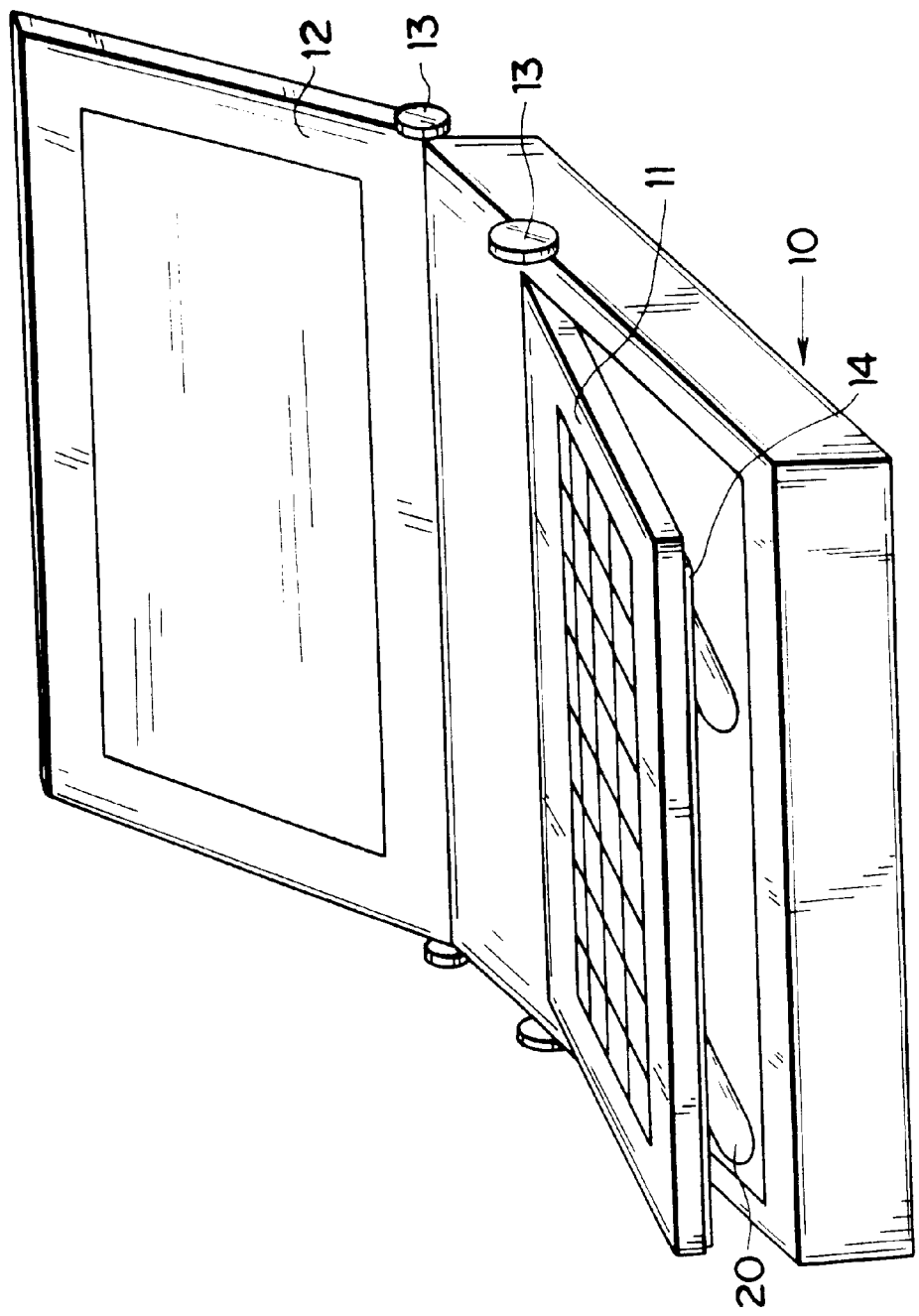
FIG. 1 is a schematic diagram showing the exterior of a notebook (or sub-notebook) personal computer according to a first embodiment of the present invention.
Figure 3:
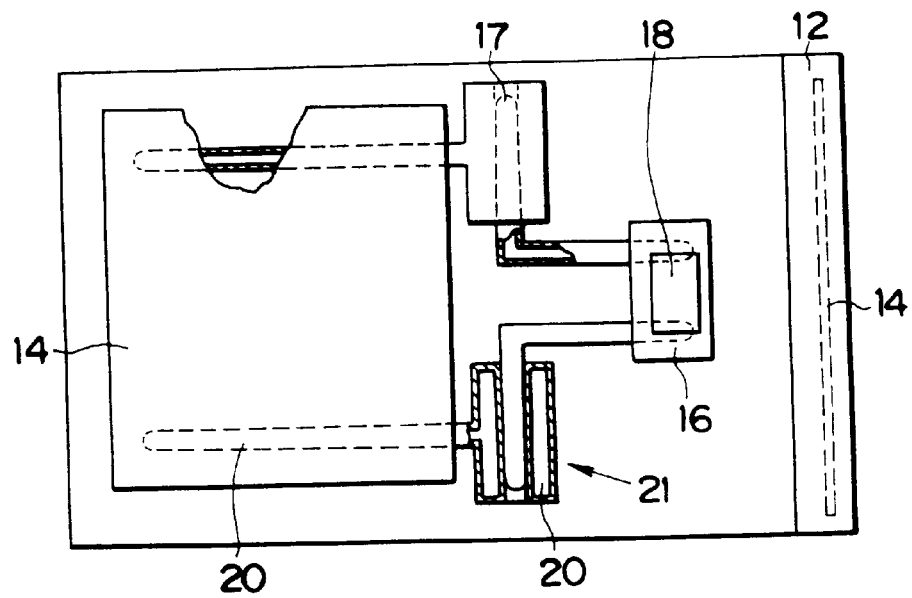
FIG. 3 is a partially cut-away top plan view showing an assembled state of first and second heat pipes of the embodiment.

In a first embodiment of the present invention, a hinge for connecting a display and a personal computer body is constructed of heat pipes. FIGS. 1 and 3 are schematic diagrams showing a notebook (or sub-notebook) personal computer according to the present invention. In these Figures, the personal computer body, as generally designated at 10, is a relatively thin, rectangular box made of a plastic panel, carbon fibers or a magnesium alloy and given a size of about A5 to A4 according to the JIS (i.e., Japanese Industrial Standard).

The personal computer body 10 is equipped on its upper face with a keyboard section 11 and a display section 12. These keyboard section 11 and display section 12 can be individually turned within predetermined ranges on hinges 13, which are disposed on the personal computer body 10, thereby to construct the socalled "openable sections." In other words, the keyboard section 11 and the display section 12 can be individually turned up from the personal computer body 10 or down from the raised positions to the personal computer body 10. In these keyboard section 11 and display section 12, there are mounted electromagnetic insulating plates 14 which are given sizes substantially equal to the respectively corresponding sections 11 and 12. These electromagnetic insulating plates 14 are made of aluminum sheets for insulating the noises and are the standard equipments of the ordinary notebook personal computer.

Figure 2:
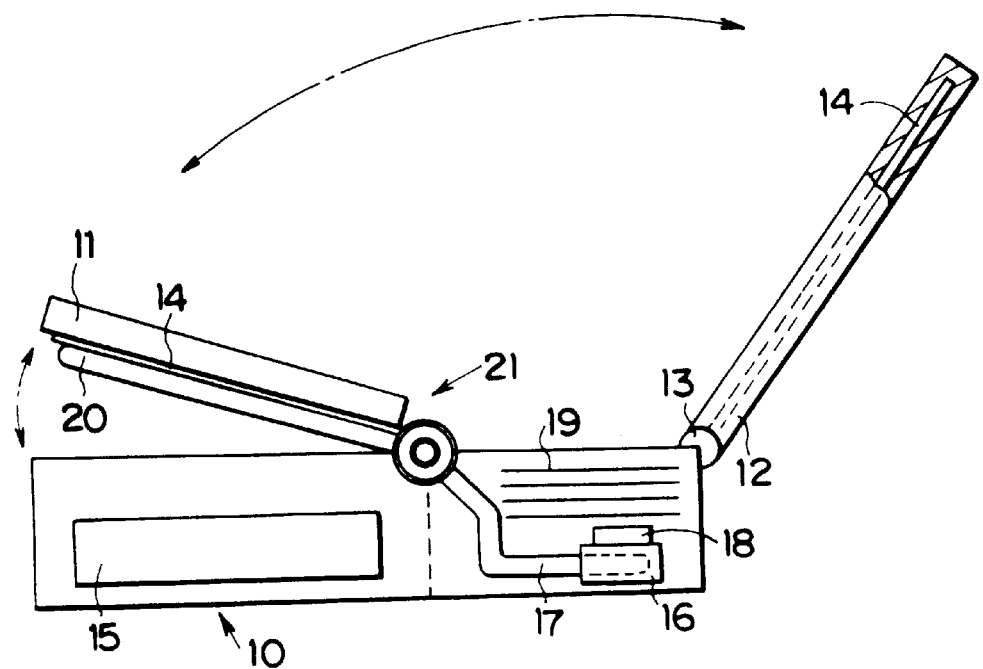
FIG. 2 is a side elevation showing an assembled state of the personal computer body of the embodiment and parts to be assembled with the body.

In the front space (as located at the side of the keyboard section 11 in FIG. 2), as halved from the inside of the aforementioned personal computer body 10, there are housed a detachable hard disk drive 15, a floppy disk drive, a battery (although both are not shown) and so on. Here, the raising/falling actions (or opening/closing actions) of the keyboard section 11 from/to the personal computer body 10 are performed to replace or remove the hard disk drive 15, the battery and so on.

On the other hand, the rear space of the personal computer body 10 is arranged on its bottom with one end portion of a first heat pipe 17 which is fitted in a plate aluminum block 16 and which is overlaid by a CPU 18. Incidentally, the aluminum block 16 is provided, if necessary, for improving the contact between the CPU 18 and the first heat pipe 17. Moreover, the CPU 18 is overlaid by a plurality of main boards 19 (or printed circuits).

The first heat pipe 17 has its other end portions folded generally at a right angle with respect to the other end portion, as arranged at the side of the aluminum block 16, and is then extended on the center axis of the hinge 13 at the side of the keyboard section 11. Moreover, the end portion of the first heat pipe 17 is rotatably fitted in a cylindrical one end portion of a second heat pipe 20. In other words, a joint portion 21 jointing the first heat pipe 17 and the second heat pipe 20 is arranged on the center axis of the hinge 13. To this joint portion 21, moreover, there is applied a suitable thermal joint for reducing the contacting resistance between the two heat pipes and for promoting the heat transfer inbetween. The other end portion of the second heat pipe 20 is arranged in close contact, for the heat transfer, with the back (as located at the lower side in FIG. 1) of the electromagnetic insulating plate 14 which in turn is in close contact with the keyboard section 11. Moreover, what is adopted as the container for either the first heat pipe 17 or the second heat pipe 20 is a small diameter pipe having a circular section. Still moreover, those portions of the heat pipes, which are out of contact with other parts, may be covered with an insulating film, although not shown.

Here, the heat pipe is prepared by confining a condensable fluid such as water or alcohol as a working fluid in an evacuated state in a container such as a metal pipe having its two ends closed. The heat pipe acts, when a temperature difference arises, to transfer the heat as the latent heat of the working fluid such that the working fluid having evaporated at a higher-temperature portion flows to a lower-temperature portion to effect a heat radiation and a condensation. Moreover, the heat conductivity of the heat pipe is superior by several tens to hundreds to that of a metal such as copper or aluminum. Incidentally, wicks for promoting the ref lux of the working fluid are disposed, if necessary, in the container.

Here will be described the operations of the cooling device thus constructed. As the notebook personal computer according to the present invention is used, a heat is generated from the CPU 18. This heat is transmitted through the aluminum block 16 to one end portion of the first heat pipe 17. At this time, the first heat pipe 17 has a temperature difference between its two end portions so that its actions are automatically started. Specifically, the working fluid confined in the container is evaporated by the heat from the CPU 18 so that the vapor flows to the other end portion in which both the temperature and the internal pressure are lower. This other end portion is enclosed by the one end portion of the second heat pipe 20, as described before, so that the heat retained by the working fluid is taken by the second heat pipe 20. In this case, the thermal joint is applied to the joint portion 21 so that the heat is efficiently transferred from the first heat pipe 17 to the second heat pipe 20. Incidentally, the working fluid of the first heat pipe 17, which has transferred the heat and has been condensed, is returned to the evaporation side by the actions of its gravity and the wicks.

On the other hand, the working fluid vapor in the second heat plipe 20 also flows to the lower-temperature/pressure other end portion, i.e., to the end portion arranged in the electromagnetic insulating plate 14. In this end portion, the working fluid vapor has its heat taken so that it is condensed. Thus, the heat of the CPU 18, as disposed in the personal computer body 10, is transferred through the first heat pipe 17 and the second heat pipe 20 to the electromagnetic insulating plate 14. The heat thus transferred is radiated from the electromagnetic insulating plate 14 to the outside.

In this way, the existing electromagnetic insulating plate 14 is used as the heat radiation face of the second heat pipe 20 to offer advantages that the space for the cooling structure to require in the personal computer body 10 can be reduced and that the weight is not substantially increased. Moreover, the electromagnetic insulating plate 14 has its surface area larger by several times than the heat radiating area to be usually retained by the fins or the like in the cooling structure of the prior art. As a result, the circulation of the working fluid in the first heat pipe 17 and the second heat pipe 20 is promoted, and the heat is reluctant to be confined in the personal computer body 10 so that[]the cooling capacity can be improved. In short, it is possible to provide a compact notebook personal computer having an excellent cooling capacity.

In the notebook personal computer according to the present invention, too, the keyboard section 11 is turned up from the personal computer body 10 when the hard disk drive 15, the battery or the like is to be attached to or detached from the personal computer body 10. In this case, the keyboard section 11 can be turned up without any trouble because the joint portion 21 between the first heat pipe 17 and the second heat pipe 20 is made coaxial with the center axis of the hinge 13 at the side of the keyboard section 11, as described before. Incidentally, in the present embodiment, the display section 12 without the second heat pipe 20 can naturally be freely turned up from and down to the personal computer body 10.

Incidentally, in case the electromagnetic insulating plate 14 is attached to a hinged member, the heat pipe mechanism may be constructed of a bendable heat pipe such as corrugated pipe in place of the paired heat pipes of the foregoing embodiment.

Figure 4:
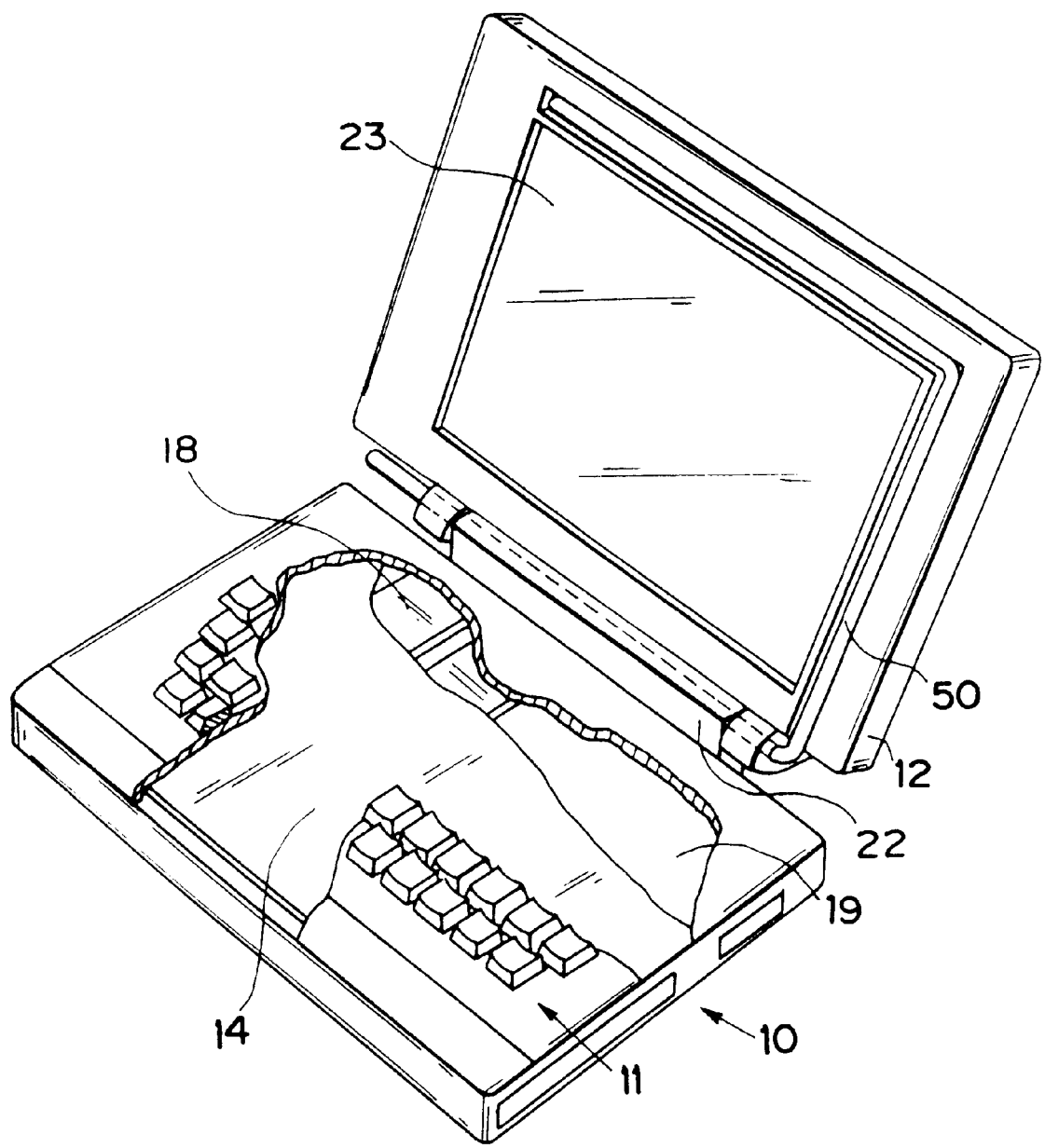
FIG. 4 is a partially cut-away perspective view showing a notebook (or sub-notebook) personal computer according to a second embodiment of the present invention.

Here will be described the construction of a second embodiment of the present invention with reference to FIGS. 4 to 6 and 35 to 37. Incidentally, the present embodiment is constructed to facilitate the attachment/detachment of the keyboard section 11 and the display section 12. The parts identical to those of the foregoing embodiment are designated at the common reference numerals, and their detailed description will be omitted. In FIG. 4, the personal computer body 10 is a relatively thin, rectangular box having a size of about A5 to A4 according to the JIS.

In the upper face of this personal computer body 10, there is fitted the keyboard section 11. However, this keyboard section 11 can be turned up from and down to the personal computer body 10 on a pivotal which is prepared on the personal computer body 10. To the back of the keyboard section 11, that is, to the face of the internal space of the personal computer body 10, there is attached the electromagnetic insulating plate 14 by suitable means. This electromagnetic insulating plate 14 is made of an aluminum sheet, for example, as supported by a mounting base section 30.

With the back of the electromagnetic insulating plate 14, moreover, there is so closely contacted the CPU 18 which is mounted on the upper face of the main board 19 as to transfer the heat. In the remaining internal space of the personal computer body 10, there are further disposed a detachable hard disk drive, a floppy disk drive, a battery, an add-in memory (although all of them are not shown) and so on.

Figure 5:
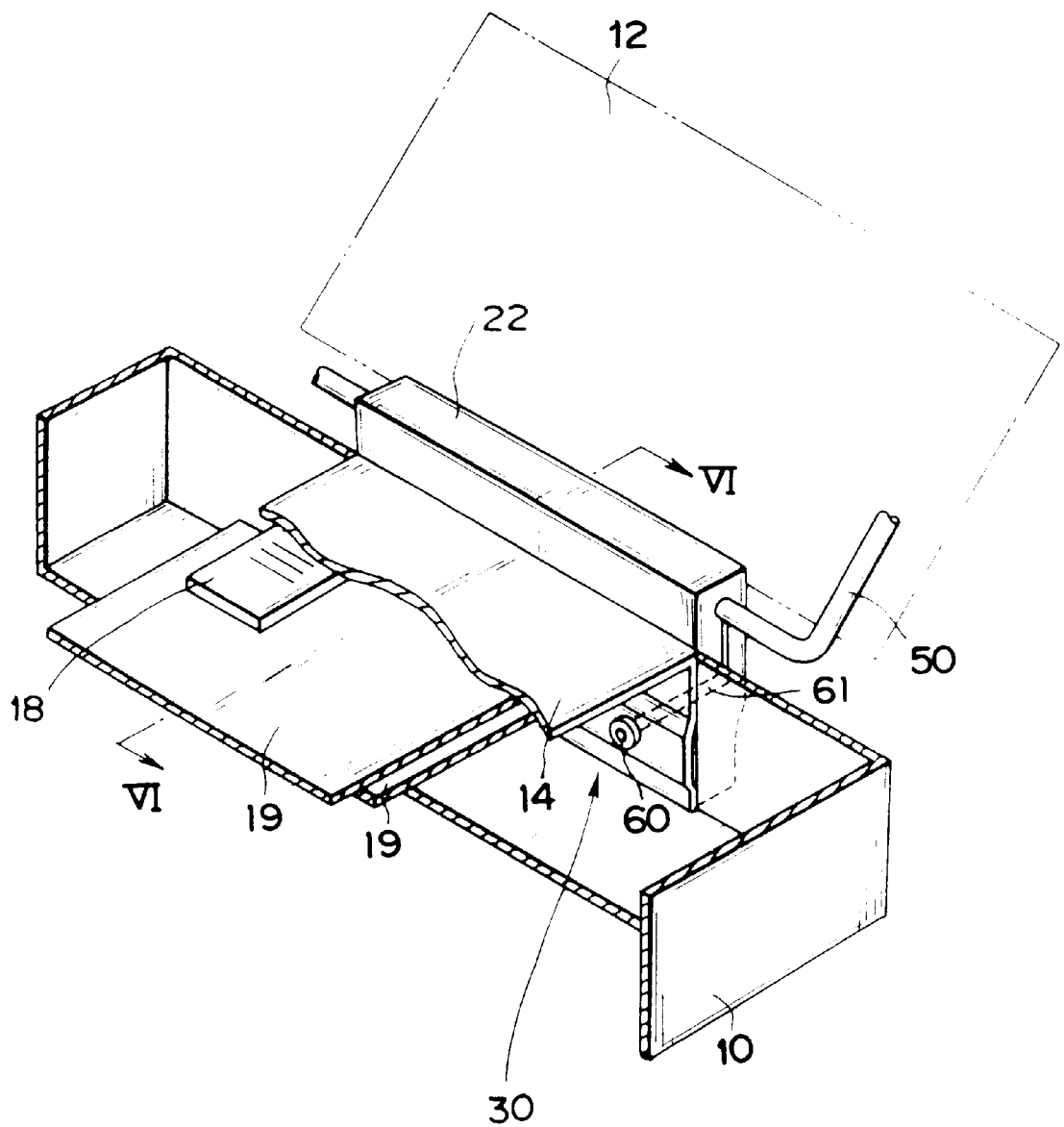
FIG. 5 is a schematic perspective view showing an arranged state of major parts of the second embodiment.

The electromagnetic insulating plate 14 has its one side edge portion folded downward generally at a right angle in parallel with the wall of the personal computer body 10, as located at the righthand side of FIG. 5, to provide the aforementioned mounting base section 30. Incidentally, the personal computer body 10 is molded in advance to have its wall partially cut away. Moreover, the mounting base section 30 for the electromagnetic insulating plate 14 is formed with a plurality of through holes which are arranged widthwise thereof at a predetermined interval. Especially to the inner side of the personal computer body 10, there are welded metal nuts 60 which are positioned to correspond to the individual positions of the through holes.

To the face of the mounting base section 30, as directed to the outside of the personal computer body 10, there is attached a pipe holder 22. This pipe holder 22 is made of a generally rectangular plate aluminum block, for example, and is formed in its widthwise direction with a generally circular clamping portion 22a profiling the sectional shape of the container of a heat pipe 50 and a conducting slit portion 22b leading downward from the clamping portion 22a. The heat pipe 50 has its intermediate portion 50a so fitted in the clamping portion 22a that it can turn freely. Incidentally, the clamping portion 22a of the pipe holder 22, in which is slidably fitted the heat pipe 50, has its aluminum anodized to have a wetting property. Alternatively, a suitable pasty thermal joint 22c may be applied to the clamping portion 22a.

Figure 6:
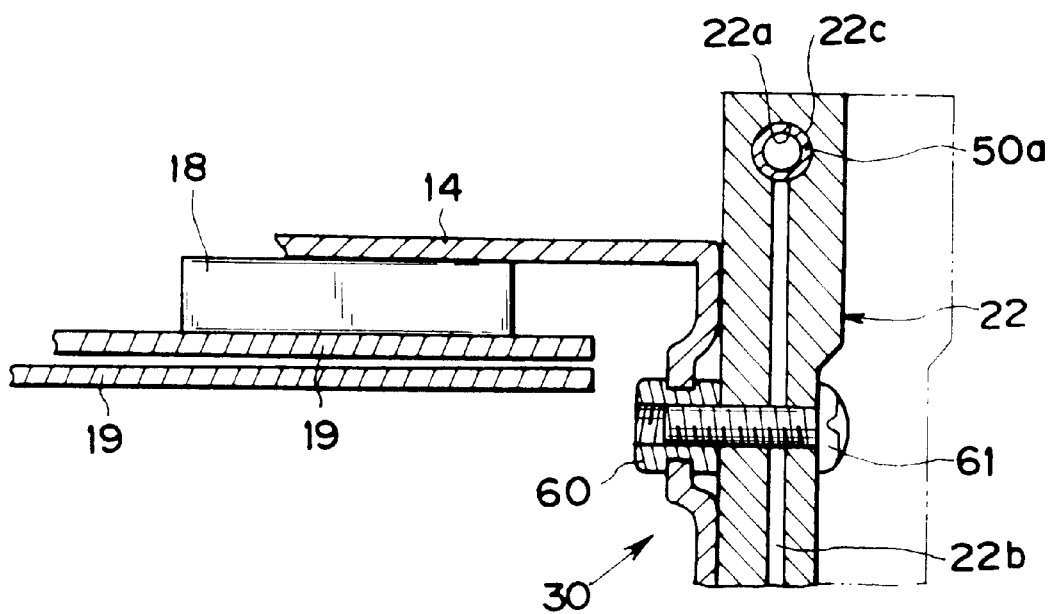
FIG. 6 is a section taken along line VI—VI of FIG. 5 and shows an assembled state of a pipe holder and a mounting base section.

Moreover, bolts 61 are inserted from the righthand face of FIG. 6 into the pipe holder 22 and driven into the nuts 60 to fasten the pipe holder 22 and the electromagnetic insulating plate 14 firmly while rotatably clamping the outer circumference of the straight portion of the heat pipe 50. Incidentally, this heat pipe 50 can be exemplified by a hard-chromium plated copper container having an external diameter of about 4 mm and confining pure water as the working fluid.

The display section 12 is formed into a generally flat plate equipped with a screen 23 made of a liquid crystal panel on its one face and has its outer wall recessed along the edges of the screen 23. Moreover, the heat pipe 50 has its leading end portion (or upper end portion) fitted along the recesses and is fixed in the display section 12 by suitable means. In short, the heat pipe 50 and the display section 12 are united with each other such that the former is exposed to the outer face of the latter. Incidentally, the heat pipe 50 may be fitted directly along the inner wall of the display unit 12. Moreover, the end portions of the heat pipe 50, as located at the side of the pipe holder 22, are inserted through the two retainers which are disposed at the lower edges of the display section 12.

As a result, the display section 12 can be turned down on the portions of the heat pipe 50 clamped by the pipe holder 22, to cover the keyboard section 11. Incidentally, the electromagnetic insulating plate 14 and the pipe holder 22 are made of aluminum, and the bolts 61 and the nuts 60 are made of a metal, as described above, so that the heat can be transferred between the pipe holder 22 and the CPU 18 and between the pipe holder 22 and the heat pipe 50.

Thus, the display section 12 of the notebook personal computer thus constructed may be detached from the personal computer body 10, by loosening the individual bolts 61 by means of a driver to extract them from the pipe holder 22. Specifically, the display section 12, the heat pipe 50 and the pipe holder 22 are made into the so-called "units" whereas the electromagnetic insulating plate 14 is united with the personal computer body 10 so that the display section 12 can be detached from the personal computer body 10 by separating the pipe holder 22 and the electromagnetic insulating plate 14. On the other hand, the display section 12 can naturally be attached to the personal computer body 10 if the bolts 61 are individually driven into the corresponding nuts 60 through the pipe holder 22.

Here will be described the action for cooling the CPU 18. This CPU 18 generates the heat, too, as the aforementioned notebook personal computer is used. In this case, the display section 12 is usually raised from the personal computer body 10. The heat from the CPU 18 is transmitted to the electromagnetic insulating plate 14 and further to the pipe holder 22 through the nuts 60 and the bolts 61. The heat is further transmitted from the pipe holder 22 to the one end portion of the heat pipe 50. At this time, the heat pipe 50 has a temperature difference between its two end portions so that its actions are automatically started.

Specifically, the working fluid in the liquid phase is heated and evaporated at the portion of the container inside, as clamped by the pipe holder 22, so that the vapor flows to the end portion of the heat pipe 50, as arranged in the display section 12. Since the display section 12 is in its raised position, as described above, the heat pipe 50 operates in the bottom heat mode, in which its evaporation portion is located at the bottom with respect to its condensation portion. The working fluid vapor has its heat taken by the atmosphere so that it is condensed at the end portion of the heat pipe 50, as arranged in the display section 12.

This heat pipe end portion is arranged along the outer wall of the display section 12, as described above, most of the heat transferred by the heat pipe 50 is radiated as it is to the atmosphere, and the remaining heat is transmitted to the outer wall of the display section 12. Moreover, the outer wall acting as the heat sink has a relatively wide area and contacts directly with the atmosphere. As a result, the heat is not confined in the display section 12 so that the CPU 18 can be efficiently cooled. Incidentally, the working fluid thus liquefied as a result of heat radiation is quickly returned by its gravity to the end portion of the heat pipe 50, as arranged at the side of the pipe holder 22, until it is warmed again by the heat which is transmitted to the CPU 18 through the electromagnetic insulating plate 14 and the pipe holder 22.

Since the condensation portion of the heat pipe 50 is thus exposed to the outside of the display section 12, the circulation of the working fluid is promoted, and in addition the transferred heat is reluctant to be confined in the display section 12. As a result, the CPU 18 can be efficiently cooled. Moreover, the existing electromagnetic insulating plate 14 has its portion worked into the base section 30 so that the cooling device can be made small and light.

Moreover, the pipe holder 22 and the mounting base section 30 can be attached/detached by means of the bolts 61 and the nuts 60. Especially, the bolts 61 have their heads disposed outside of the personal computer body 10 so that the display section 12 can be easily attached to and detached from the personal computer body 10. As a result, the personal computer can have its functions graded up with ease.

Incidentally, the second embodiment is constructed such that the electromagnetic insulating plate 14 and the mounting base section 30 are united with each other. However, the present invention should not be limited to that construction but may be exemplified such that the heat can be transferred between the pipe holder 22 and the CPU 18 when the personal computer is its ordinary use. Hence, the mounting base section 30 may be made separate from the electromagnetic insulating plate 14 made of an aluminum block, or the pipe holder 22 may be attached directly to the case of the CPU 18. Moreover, the pipe holder 22 is removably attached to the personal computer body 10 in the second embodiment, but it may be fixed on the personal computer body 10 so that it may be attached to or detached from the display section 12. Still moreover, the heat pipe 50 itself provides the pivotal shaft, but the present invention should not be limited thereto.

Figure 35:
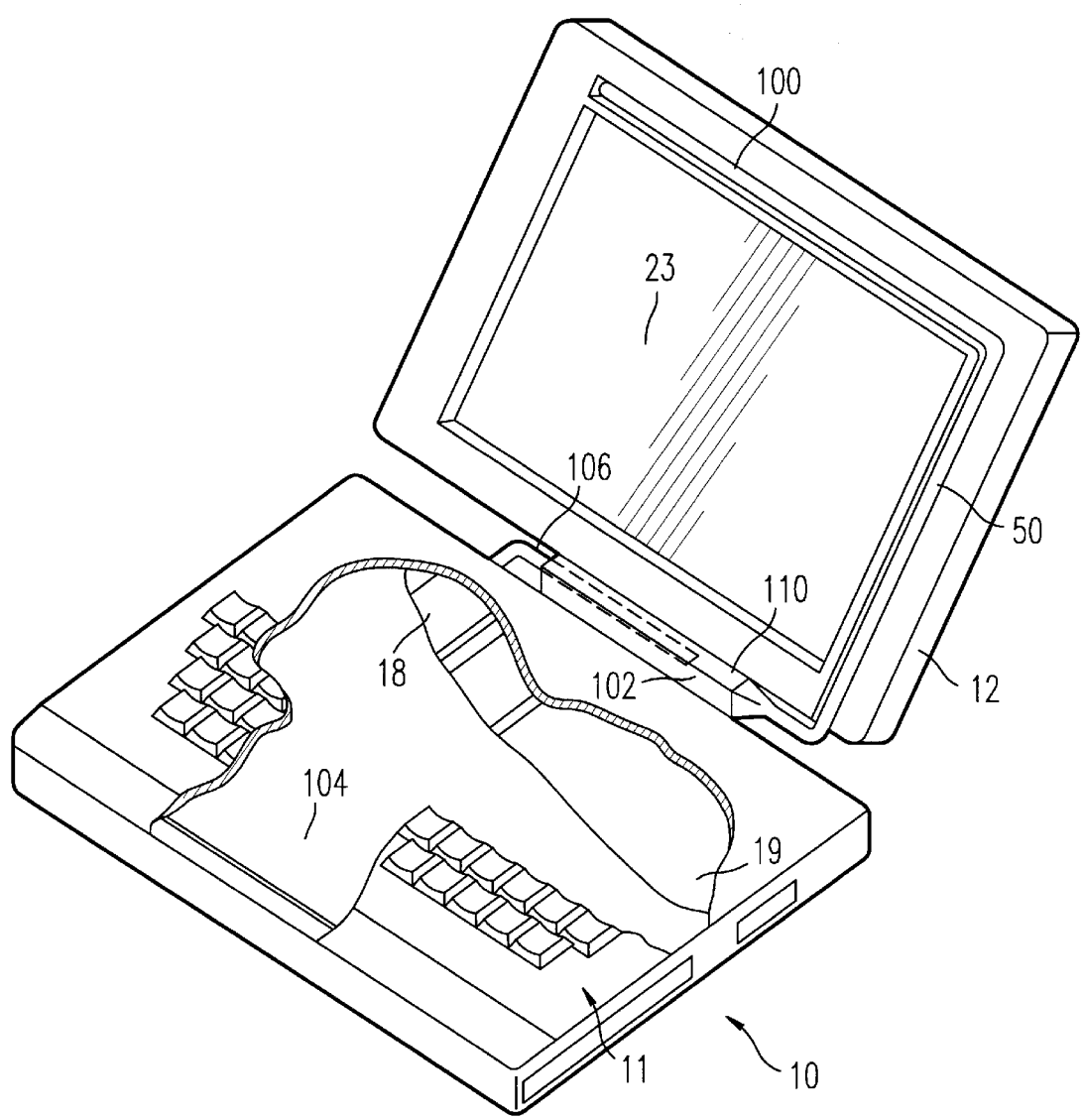
FIG. 35 is a partially cut-away perspective view showing a notebook personal computer wherein two heat pipes form a hinge.
Figure 36:
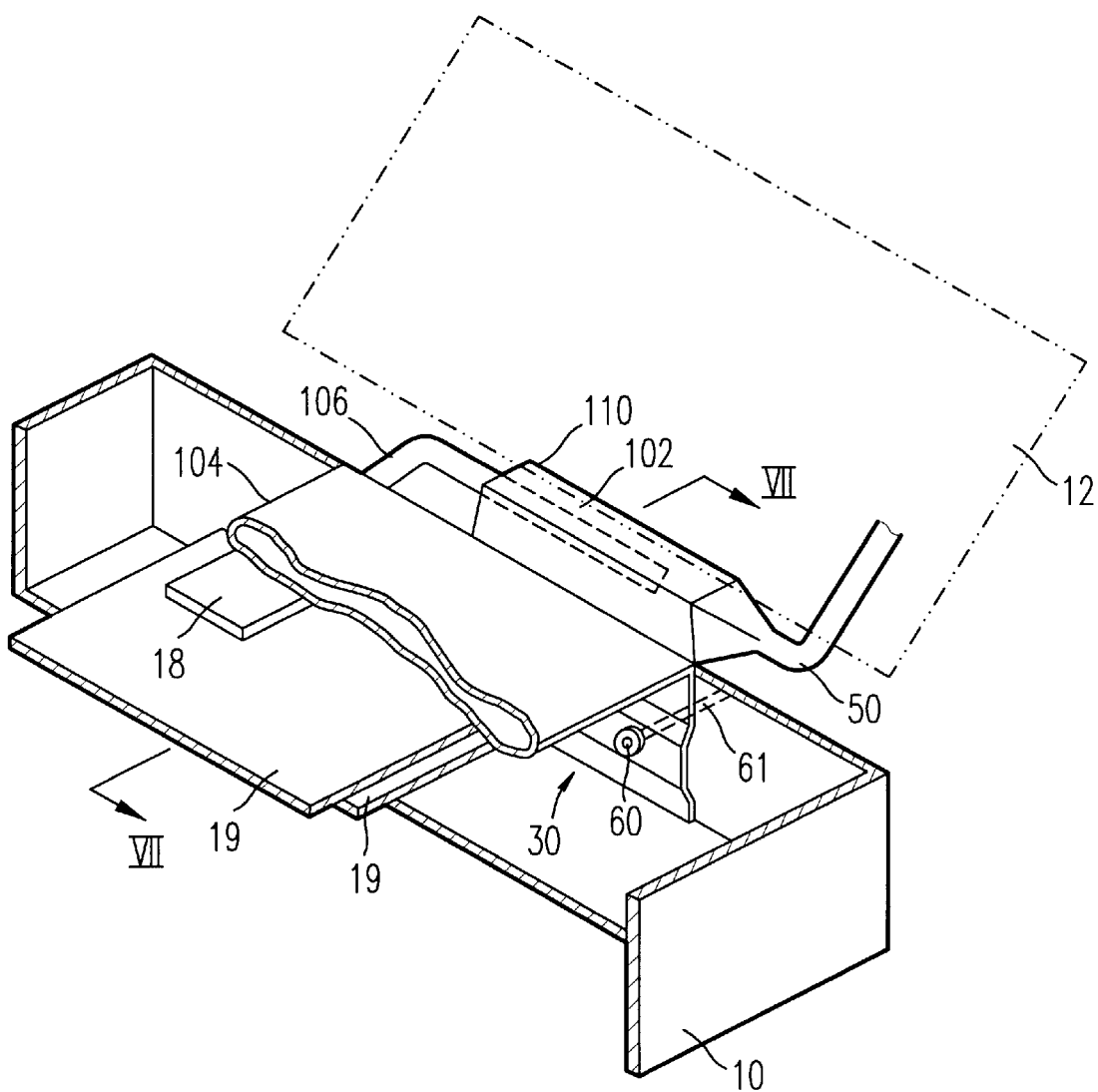
FIG. 36 is a schematic perspective view showing an arranged state of major parts of the embodiment shown in FIG. 4.
Figure 37:
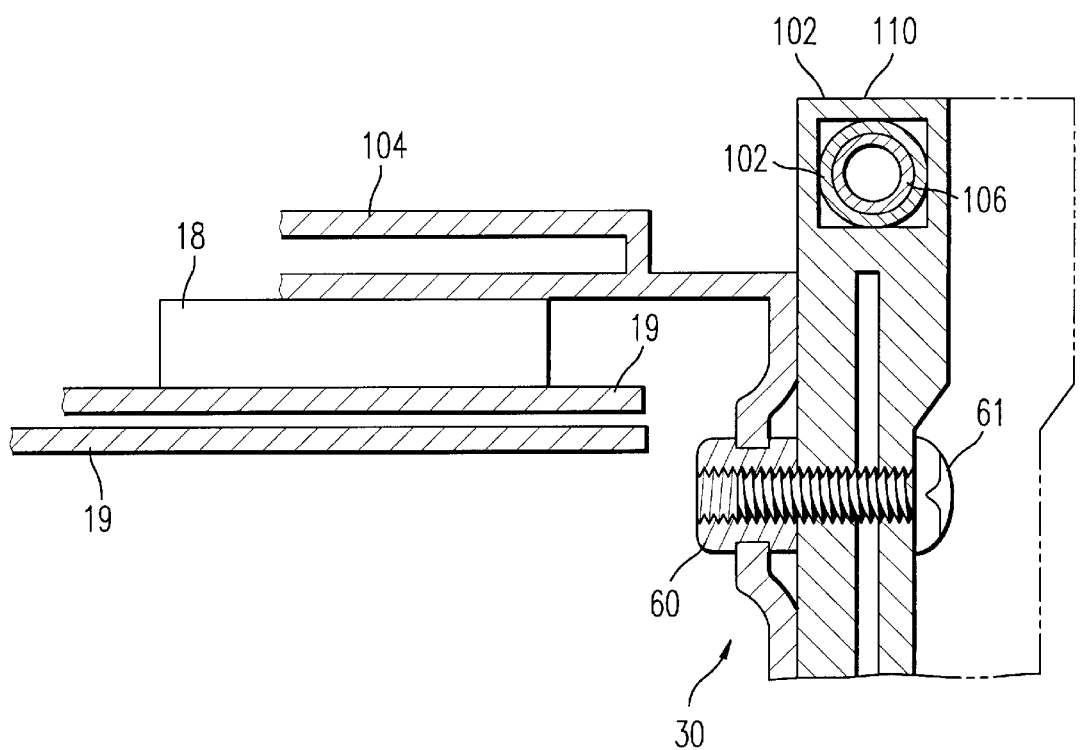
FIG. 37 is a partial section view along line VII—VII of FIG. 36i.

FIGS. 35–37 show a variation on the hinge attachment as shown in FIGS. 4–6. The hinge arrangement shown in FIGS. 35–37 is also similar to the hinge arrangement shown in FIGS. 2 and 3 where a first heat pipe having two ends, one end of which is connected to a CPU and the other end is connected to a second heat pipe. In FIG. 3 the second heat pipe surrounds one end of the first heat pipe forming a hinge, the other end of the second heat pipe dissipates heat underneath the keyboard 11. In the present variation, as shown in FIGS. 35–37, the heat pipe 50 which has one end 100 terminating along the display section 12 and its other end, a hinge end 102, terminates at the hinge and forms part of the hinge 110. Another heat pipe 104 is connected at one of its ends to the CPU 18. The other end of the heat pipe 104 terminates at a hinge end 106 at the hinge 110. The hinge end 106 of the heat pipe 104 inserts into the hinge end 102 of heat pipe 50 so as to form a hinge 110 where the display section 12 is rotatable about the hinge 110 relative to the computer body 10.

During operation, the fluid within the heat pipe 104 is evaporated near the CPU 18. The vapor then flows to the hinge end 106 of the heat pipe 104 and is condensed. The thermal energy which flows from the hinge end 106 of the heat pipe 104 flows into the hinge end 102 of the heat pipe 50 thus evaporating the fluid within the heat pipe 50. The evaporated material within the heat pipe 50 flows to the display section end 100 of the heat pipe 50 where it is condensed and the heat energy is dissipated into the environment.

Here will be described a construction of a third embodiment of the present invention with reference to FIGS. 7 and 8. In the embodiment disclosed herein, the heat pipe adopted is flattened into a plate shape having its condensation face exposed from the personal computer body 10.

Figure 7:
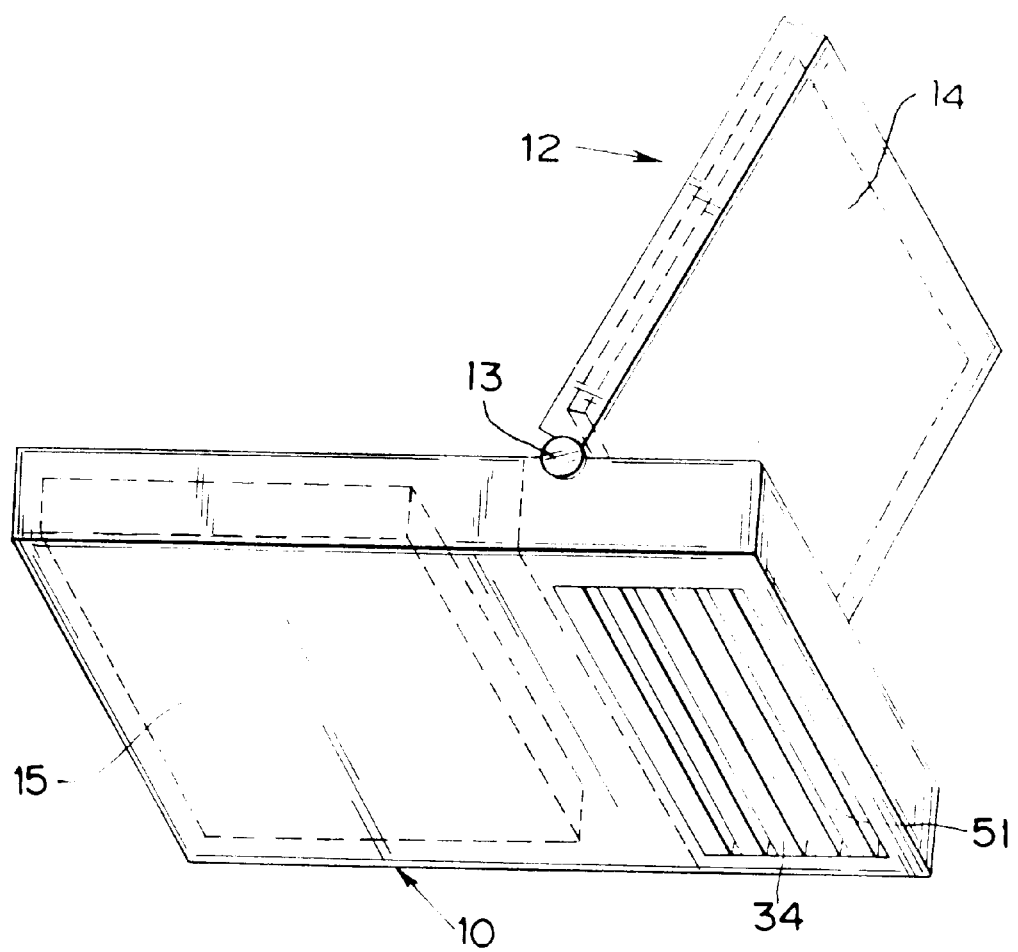
FIG. 7 is a schematic bottom view showing a notebook (or sub-notebook) personal computer according to a third embodiment of the present invention.

As shown in FIG. 7, the personal computer body 10 is equipped on its upper face with the keyboard section (although not shown) and the display section 12. This display section 12 can be freely turned within a predetermined range on the hinge 13 which is arranged on the personal computer body 10, thereby to construct the so-called "openable section." In these display section 12 and keyboard section, there are individually mounted the electromagnetic insulating plates 14 which are given equal sizes.

In the front half of the halved spaces of the personal computer body 10, there are mounted the detachable hard disk drive 15, the floppy disk drive and the battery (although both of which are not shown), and so on. In the bottom of the latter half space (as located at the side of the display section 12 in FIG. 7) at the back of the personal computer body 10, on the other hand, there is mounted a plate heat pipe 51 through a fixing spring 31. This plate heat pipe 51 is prepared by confining the working fluid in a closed rectangular container having a hollow plate shape. In the shown embodiment, the plate heat pipe 51 is equipped in the substantially whole area of the inner wall of the container with wicks 32 for sucking the working fluid in liquid phase by the capillary pressure, so that it may be used in the top heat mode, as will be described hereinafter.

Figure 8:
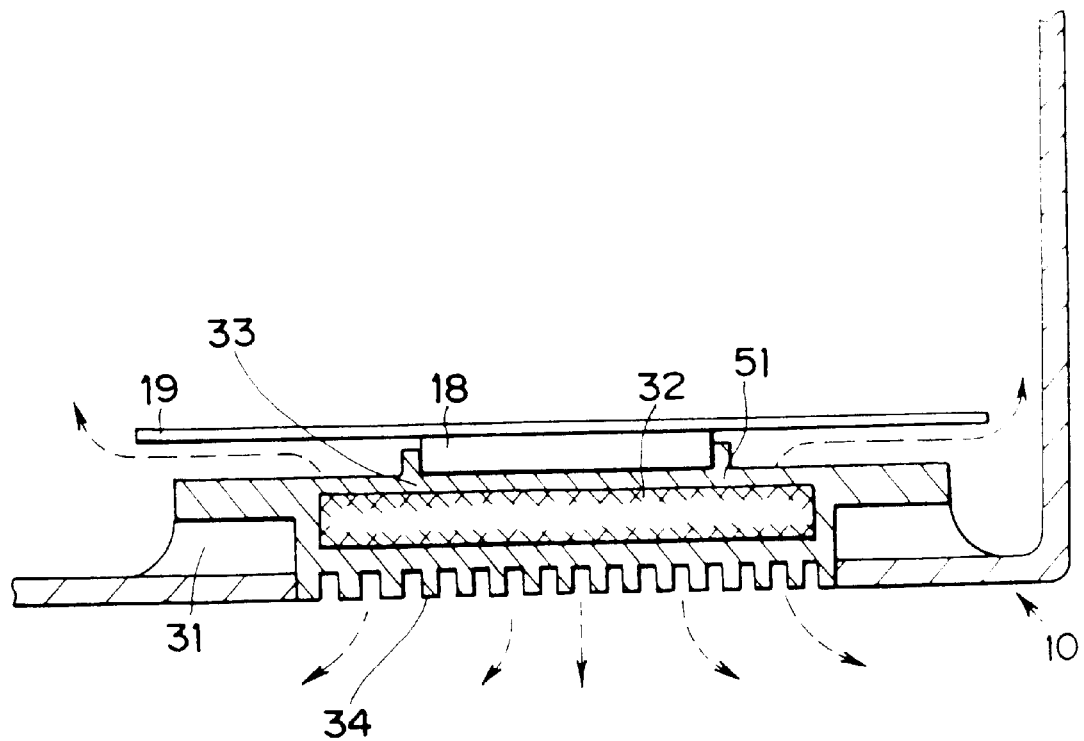
FIG. 8 is a section showing an assembled state of a plate heat pipe and a personal computer body according to a third embodiment.

As shown in FIG. 8, on the other hand, the CPU 18 acting as the heat source is mounted by suitable means on the upper face of the container of the plate heat pipe 51. In other words, this upper face provides an evaporation face 33 of the plate heat pipe 51. On the other hand, the lower face of the container of the plate heat pipe 51 is formed to have a corrugated section having its ridges exposed to the bottom face of the personal computer body 10, preferably coextensively to the outside of the personal computer body 10 from the opening which is formed partially in the bottom face of the personal computer body 10. In other words, the plate heat pipe 51 has its condensation face 34 forming a portion of the bottom face of the personal computer body 10. Moreover, a plurality of main boards 19 are arranged over the CPU 18.

Here will be described the operations of the cooling device thus constructed. The CPU 18 generates the heat as the notebook personal computer is used. This heat is transmitted to the container of the plate heat pipe 51 which is disposed below the CPU 18. At this time, too, a local temperature difference is established in the container of the plate heat pipe 51, and the action of this plate heat pipe 51 is automatically started.

Specifically, the working fluid in liquid phase, as contacting with the inner wall of the evaporation face 33 of the plate heat pipe 51, is evaporated by the heat from the CPU 18 so that the vapor flows to the condensation face 34 in which both the temperature and the internal pressure are lower. Since this evaporation face 34 is exposed to the outside from the personal computer body 10 while being given a large surface area, as described above, the working fluid having flown to the side of the condensation face 34 is efficiently cooled down. Specifically, the heat of the CPU 18, as disposed in the personal computer body 10, is radiated to the outside of the personal computer body 10 by the plate heat pipe 51. Incidentally, the working fluid, as condensed after having radiated its heat, is sucked by the wicks 32 to the evaporation face 33, where it is heated again.

Thus, the plate heat pipe 51 mounted in the personal computer body 10 has its condensation face 34 exposed to the outside of the personal computer body 10, so that the circulation of the working fluid is promoted while preventing the heat from being confined in the personal computer body 10. As a result, the cooling capacity is superior to that of the cooling structure of the prior art. Moreover, the fins of the prior art are eliminated, and the condensation face 34 is flush with the bottom of the personal computer body 10, so that the structure for the cooling action can be reduced. In other words, it is possible to provide a compact notebook personal computer which has an excellent cooling capacity.

Here will be described an example in which the heat pipe for the personal computer cooling device of the present invention is flattened. FIG. 9 is a perspective view showing the exterior of a plate heat pipe 51. This plate heat pipe 53 is exemplified by confining pure water as the working fluid in a hollow plate container 54 which is formed of a copper pipe having a thickness of about 0.4 to 0.5 mm into a size having a width of about 3 to 30 mm and a height of about 2 to 4 mm.

This plate heat pipe 53 is laid in the notebook personal computer body 10 such that its end portion at a condensation portion 35 is arranged in a heat transferring manner on the upper face of a metal chassis 36 existing in the bottom of the personal computer body 10. On the upper face of the other end portion (or an evaporation portion 39) of the container 54, there is mounted in a heat transferring manner a micro processing unit (i.e., MPU) 26 which is a heat generating portion. This MPU 26 is placed in the personal computer body 10 at a higher level than that of the aforementioned chassis 36. Incidentally, another heat generating portion can be exemplified by the various metal connectors, the electromagnetic insulating plate, the battery and the magnesium case of the personal computer body 10, which are mounted as the standard components in the notebook or sub-notebook personal computer.

Here will be described an embodiment of the internal structure of the aforementioned container 54. In the construction of this fourth embodiment, as shown in FIGS. 10 and 11, a spiral member 37 for fixing the wicks is disposed generally at the widthwise central portion in the container 54 and spirally arranged in the longitudinal direction of the container 54. This spiral member 37 is exemplified by winding a tape of phosphor bronze having a thickness of about 0.1 to 0.3 mm and a width of 0.5 to 1.0 mm, spirally into a rectangular section having a height of about 1.0 to 3.0 mm and a width of two thirds of that of the container 54 and at an interval (or gap) 100 of about 0.5 to 2.0 mm. Moreover, this spiral member 37 is held, at the outer faces of its upper and lower portions, in direct contact with the inner wall of the container 54. Another example of this spiral member 37 is exemplified by winding a copper or aluminum tale having an elliptical section circularly to leave gaps only at its two longitudinal ends.

The spaces, as left in the container 54 at the two sides of the spiral member 37, are filled up with a number of wicks 38 extending in the longitudinal direction thereof. These wicks 38 are exemplified by extremely thin copper wires having a diameter of 0.02 to 0.1 mm. The wicks 38 can be made lighter if the copper wires are replaced by carbon fibers plated with copper. Moreover, these wicks 38 are fixed in the container 54 while being pushed onto the sides of the inner wall of the container 54 by the righthand and lefthand two sides of the spiral member 37. In this case, the spiral member 37 of phosphor bronze has a high elasticity in the wound radial direction so that the wicks 38 are fixed in position without getting loose.

In short, it is sufficient that the wicks 38 are arranged in the longitudinal direction while being pushed onto the inner wall of the container 54. Thus, the wicks 38 may be inserted into only one side space of the spiral member 37 in the container 54, for example.

Figure 12:
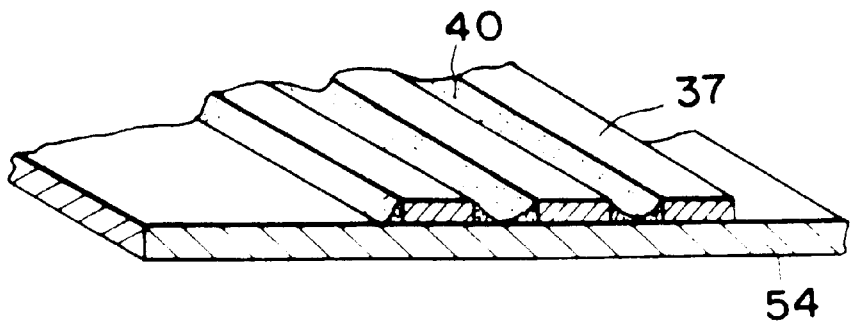
FIG. 12 is a sectional perspective view showing the state of the fourth embodiment, in which a working fluid comes into the gaps of the spiral member.
Figure 13:
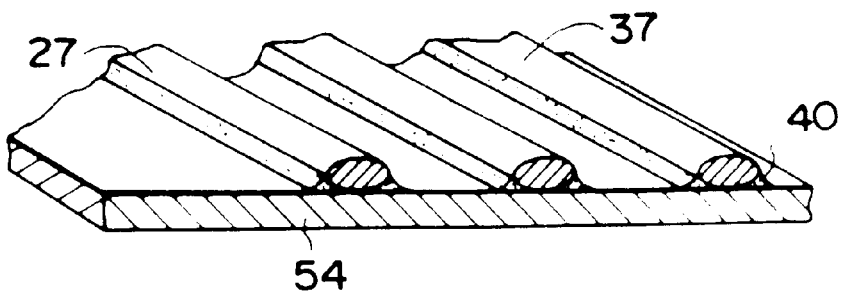
FIG. 13 is a section showing the state of the fourth embodiment, in which the working fluid comes into the gaps between a spiral member having an elliptical section and a container wall face.
Figure 14:
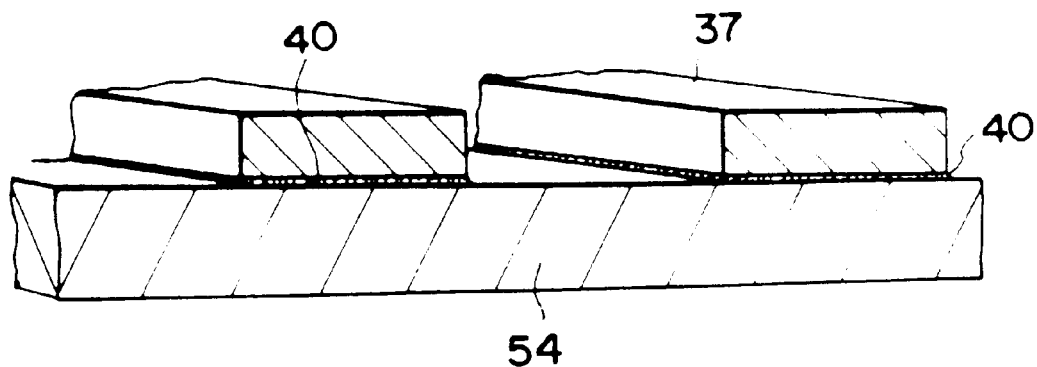
FIG. 14 is a section showing the state of the fourth embodiment, in which the working fluid comes into the gaps between the wall face of the spiral member and the container wall face.

Here will be described the operations of the plate heat pipe 53 thus constructed, with reference to FIGS. 12 to 14. At first, the heat, which is generated in the MPU 26 as the personal computer body 10 is used, is transmitted to the upper face of the container 54 of the plate heat pipe 53. Since the inner wall of the container 54 and the wicks 38 have already been wetted with a working fluid 40, the heat pipe action for the heat source of the MPU 26 is immediately started.

Specifically, the vapor, as produced in the end portion of the plate heat pipe 53 at the side of the MPU 26, flows through the gaps 100 into the inside space of the spiral member 37 and further toward that end portion arranged on the chassis 36, which has a lower internal pressure. As a result, the inside of the spiral member 37 provides the passage for the vapor. This working fluid vapor comes out of the gaps 100 at the other end of the spiral member 37, and its heat is taken by the wall face of the container 54 until it is condensed. In other words, the heat of the MPU 26 is transmitted from that end portion to the chassis 36.

Of the plate heat pipe 53, therefore, the end portion arranged on the chassis 36 acts as the condensation portion 35, and the end portion arranged on the MPU 26 acts as the evaporation portion 39. In this case, the evaporation portion 39 is at a higher position than that of the condensation portion 35 so that the heat pipe takes the top heat mode. The working fluid 40 having restored the liquid phase is sucked up and delivered to the evaporation portion 39 by the wicks 38. Thus, the wicks 38 act as the liquid passage. The wicks 38 are made of a number of extremely thin wires so that the so-called "pumping force" is high, and the wicks 38 are arranged all over the length of the container 54 so that the reflux of the working fluid 40 to the upper evaporation portion 39 is ensured.

This reflux is supplied by the working fluid 40 which is delivered in the inner circumference of the container 54 from the wicks 38 along the spiral member 37 by the capillary pressure to be established due to the meniscuses between the spiral member 37 and the wall of the container 54 and between the edges of the tape forming the gaps 100. In short, the working fluid 40 in liquid phase is smoothly supplied to the wide range of the evaporation portion 39. As a result, the heat transfer cycle by the working fluid 40 is activated to cool the MPU 26 efficiently.

Thus, the plate heat pipe 53 described above not only has its vapor passage and liquid passage separated and but also has an excellent reflux capacity of the working fluid 40 by the wicks 38. As a result, the various demands such as the size, as required for the heat pipe to cool the portable personal computer, can be satisfied. At the same time, this heat pipe can exhibit an excellent heat transfer capacity in the operations in the top heat mode or in the inclined state. In addition, the capacity of the heat pipe for cooling the MPU 26 can be drastically improved over that of the ordinary plate heat pipe of the prior art. Moreover, both the container 54 and the elements inserted therein are given proper flexibilities so that they can be deformed according to the layout of the heat generating and radiating portions.

Figure 15:
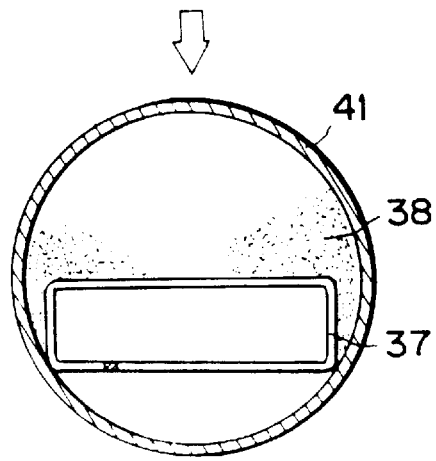
FIG. 15 is a section showing a step of a process for manufacturing the plate heat pipe of the fourth embodiment and shows the pipe in the state arranged with the spiral member and the wicks.

Here will be described a process for manufacturing the container of the plate heat pipe 53 according to the fourth embodiment, as shown in FIGS. 10 and 11. Incidentally, the components thus far described are designated at the identical reference numerals, and their detailed description will be omitted. First of all, a pipe 41 having a circular section is prepared as the material for the container 54, as shown in FIG. 15. This pipe 41 is a copper pipe having a thickness of about 0.4 to 0.5 mm. Then, the spiral member 37, which has already been spirally wound into the rectangular shape, is longitudinally inserted into the pipe 41.

Next, the wicks 38 are inserted into the spaces between the spiral member 37 and the inner wall of the pipe 41. At this time, the pipe 41 is not formed in advance into a flattened shape but is formed into a circular shape providing a relatively large aperture for the insertion. As a result, the wicks 38 made of extremely thin wires having a diameter of about 0.02 to 0.1 mm can be inserted without any trouble even if they are numerous. Incidentally, the insertion order of the wicks 38 and the spiral member 37 may be reversed, and these components are degreased and rinsed before used.

Figure 16:
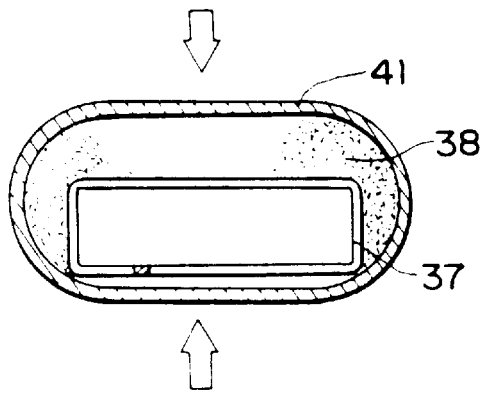
FIG. 16 is a section showing an intermediate state in which the pipe is collapsed in the fourth embodiment.

Next, the pipe 41 having the wicks 38 inserted is sent to a collapsing step (as shown in FIG. 16). At this step, there can be adopted the method/means known in the prior art. For example, the pipe 41 is laid with its lower side being fixed and is collapsed at its upper portion evenly in the longitudinal direction to such an extent that the spiral member 37 is slightly deformed.

Figure 17:
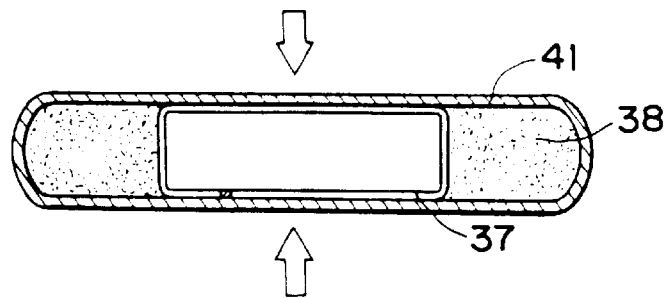
FIG. 17 is a section showing the state in which the pipe collapsing step is ended in the fourth embodiment.

Then, the wicks 38 are gradually pushed by the two side faces of the spiral member 37 until they are fixed on the side walls of the container 54. At this step of collapsing the pipe 41, moreover, the container 54 is supported at its inside by the spiral member 37 having a sufficient elasticity in its winding direction so that the pipe 41 is not longitudinally impressed at the widthwise centers of the upper and lower faces (or flat portions) of the pipe 41, as shown in FIG. 17. Thus, the flattened hollow container 54 can be easily prepared.

The whole process is completed by sealing the two open ends of the collapsed flat pipe 41 by welding means or the like, although not shown, and by filling a predetermined amount of pure water as the working fluid 40 in an evacuated state. Incidentally, this step for preparing the heat pipe can adopt the method/means known in the prior art. Since a metal such as copper is used as the materials for the individual components, as described above, there is obtained an advantage that the shaping treatment can be facilitated.

Thus, according to the manufacture method thus far described, it is possible to efficiently prepare the plate heat pipe which is excellent in the heat transfer capacity for cooling the portable personal computer.

In the aforementioned manufacture process, moreover, the spiral member 37 is spirally wound into the hollow rectangular shape but may be modified into a spiral winding having a hollow circular shape (i.e, a cylindrical shape).

Figure 18:
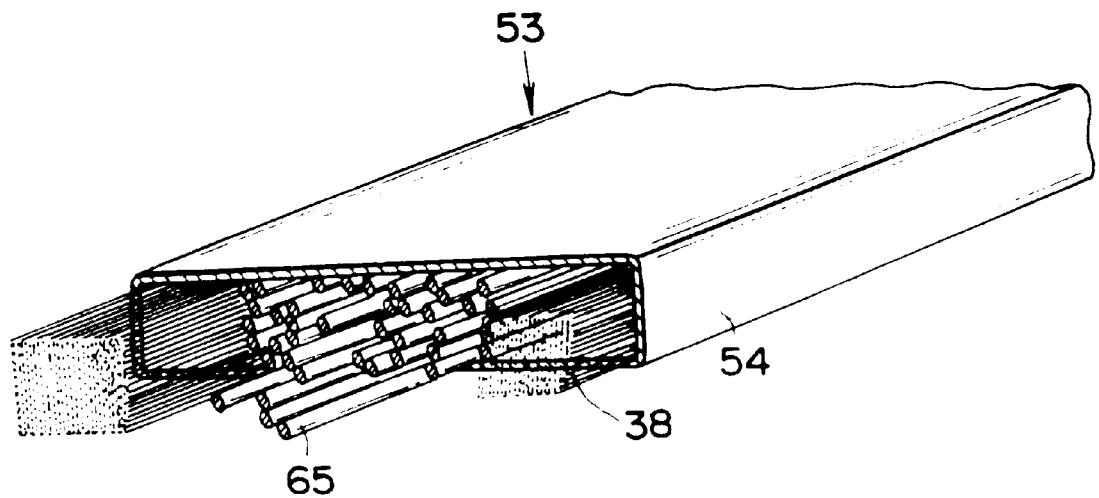
FIG. 18 is a partially cut-away perspective view showing an internal structure of a plate heat pipe according to a fifth embodiment of the present invention.
Figure 19:
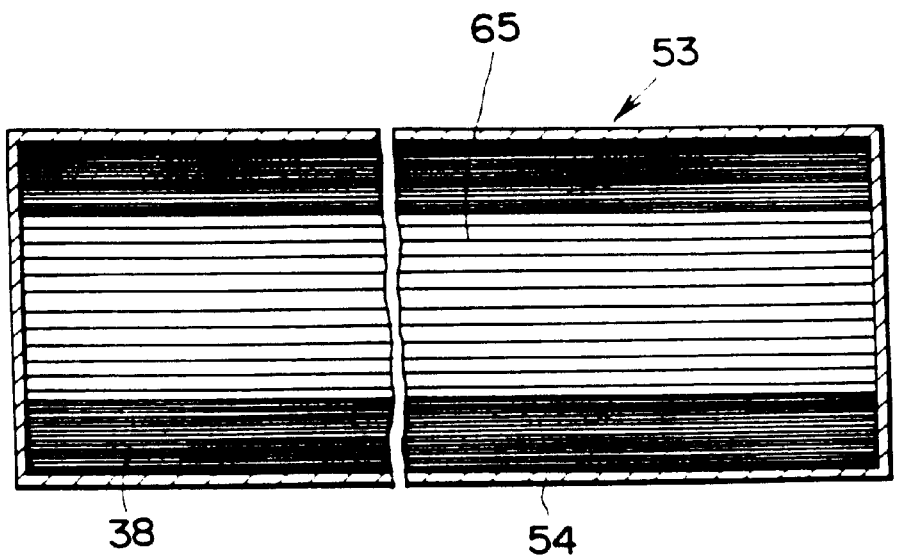
FIG. 19 is a section showing an arranged state of wicks and wires in the container in accordance with the fifth embodiment.

In a construction of a fifth embodiment, as shown in FIGS. 18 and 19, a number of wires 65 are so arranged as thin filaments generally at the widthwise center position in the container 54 that they extend in the longitudinal direction while contacting with the upper and lower faces of the inner wall of the container 54. These wires 65 are made of copper to have a diameter of 0.3 to 1.0 mm, for example. On the other hand, the spaces in the container 54 at the two sides of the wires 65 are filled up with the numerous wicks 38 which extend in the longitudinal direction. These wicks 38 are made of extremely thin copper wires having a diameter of about 0.05 to 0.2 mm. Incidentally, both these wicks 38 and the wires 65 as the thick filaments can be made of copper-plated carbon fibers in place of the copper wires.

Incidentally, it is sufficient that the wicks 38 are arranged longitudinally of the container without getting loose. Therefore, the wires 65 may be arranged at one side in the container 54 to have the remaining space filled up with the wicks 38.

Here will be described the operations of the plate heat pipe 53 according to the fifth embodiment, as shown in FIGS. 18 and 19. First of all, the heat is transmitted to the upper face of the container 54 of the plate heat pipe 53 as it is generated in the MPU 26 in accordance with the use of the personal computer body 10. Since the inner wall of the container 54, the wicks 38 and the wires 65 have already been wedded with the working fluid, the heat pipe action using the MPU 26 as the heat source is immediately started.

Specifically, the vapor is produced in the end portion of the plate heat pipe 53 at the side of the MPU 26 and flows into the clearances between the wires 65 having a larger effective capillary radius than that of the wicks 38 and further to the other end portion arranged on the chassis 36, which has a lower internal pressure. This means that the vapor passage is formed in the grouped wires 65 (i.e., between the clearances of the wires 65). The vapor of the working fluid comes out of the clearances of the wires 65 at the other end until it is condensed while having its heat taken by the wall of the container 54. In short, the heat generated in the MPU 26 is transmitted from that end portion to the chassis 36.

Of the plate heat pipe 53, the end portion arranged on the chassis 36 provides the condensation portion 35, and the end portion arranged on the MPU 26 provides the evaporation portion 39. In this case, the evaporation portion 39 is positioned at a higher level than that of the condensation portion 35 so that the heat pipe takes the top heat mode. On the other hand, the working fluid, which restores the liquid phase to wet the wall of the container 54 and the grouped wires 65, is sucked up and delivered to the evaporation portion 39 by the wicks 38.

Thus, the wicks 38 act as the liquid passage. The wicks 38 are made of a number of extremely thin wires so that the so-called "pumping force" is high, and the wicks 38 are arranged all over the length of the container 54 so that the reflux of the working fluid to the upper evaporation portion 39 is ensured. Moreover, the working fluid thus returned is evaporated in the inner bottom of the container 54 and in the grouped wicks 38 and flows to the grouped wires 65 thereby to repeat a cycle like the aforementioned one. As a result, the MPU 26 is efficiently cooled.

Thus, the plate heat pipe 53 described above not only has its vapor passage and liquid passage separated and but also has an excellent reflux capacity of the working fluid by the wicks 38. As a result, the various demands such as the size, as required for the heat pipe to cool the portable personal computer, can be satisfied. At the same time, this heat pipe can exhibit an excellent heat transfer capacity in the operations in the top heat mode or in the inclined state. In addition, the capacity of the heat pipe for cooling the MPU 26 can be drastically improved over that of the ordinary plate heat pipe of the prior art. Moreover, both the container 54 and the elements inserted therein are given proper flexibilities so that they can be deformed according to the layout of the heat generating and radiating portions.

Figure 20:
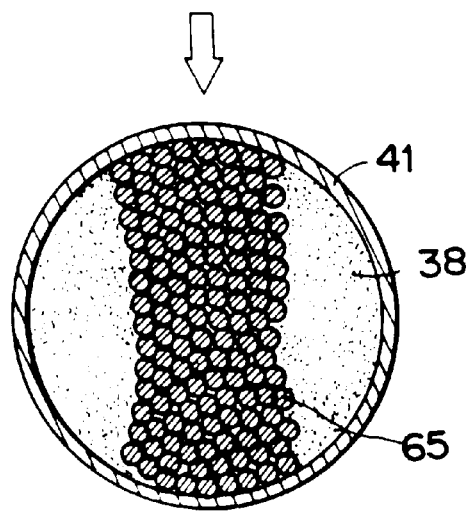
FIG. 20 is a section showing a step of a process for manufacturing the plate heat pipe according to the fifth embodiment and shows the pipe of the state in which the wicks are arranged at the two sides of the wires.

Here will be described a process for manufacturing the container for the plate heat pipe 53 according to the fifth embodiment. The pipe 41 having a circular section is prepared as the material for the container 54. This pipe 41 is a copper type having a thickness of about 0.4 to 0.5 mm. Next, the numerous wires 65 are axially inserted into the pipe 41. Then, the wires 65 are so arranged in the widthwise center portion of the pipe 41 as to contact with the upper and lower faces of the pipe 41, as shown in FIG. 20.

Next, the wicks 38 are filled in the spaces between the wires 65 and the inner wall of the pipe 41. At this time, the pipe 41 is not flat but circular providing a relatively large aperture for the insertion. As a result, the extremely thin wicks 38 having a diameter of about 0.05 to 0.2 mm can be inserted without any trouble even if they are numerous. Incidentally, the insertion order of the wicks 38 and the wires 65 may be reversed, and these components are degreased and rinsed before used.

Figure 21:
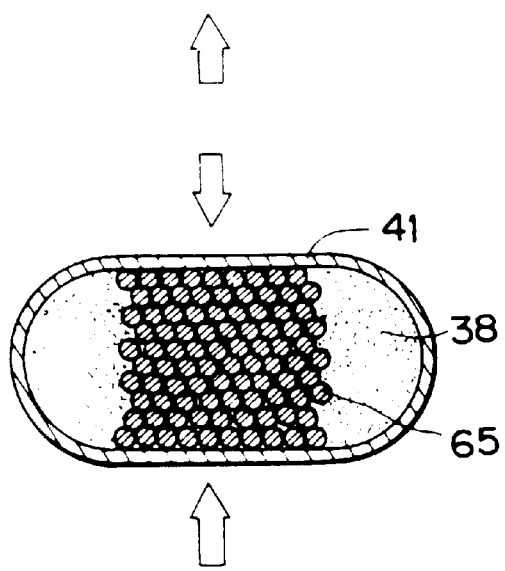
FIG. 21 is a section showing an intermediate state in which the pipe is collapsed in the fifth embodiment.
Figure 22:
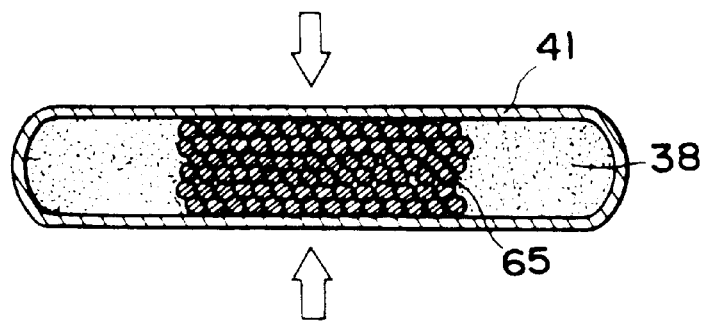
FIG. 22 is a section showing the state in which the pipe collapsing step is ended in the fifth embodiment.

Next, the pipe 41 having the wicks 38 inserted is sent to a collapsing step (as shown in FIG. 21). At this step, there can be adopted the method/means known in the prior art. For example, the pipe 41 is laid with its lower side being fixed and is collapsed against the grouped wires 65 and wicks 38 at its upper portion evenly in the longitudinal direction. In other words, the collapsing step is effected in the direction perpendicular to the direction to bind the wicks 38. Then, the individual wicks 38 and the individual wires 65 are gradually widened in the widthwise direction of the container 54. Since the pipe 41 is then supported from its inside by the wires 65, the pipe 41 is not impressed in the longitudinal direction at the widthwise centers of the upper and lower faces thereof, as shown in FIG. 22, so that the flattened hollow container 54 is prepared without fail. Moreover, the collapsing direction is the aforementioned one, in which the pipe 41 is not collapsed with the wires 65 and the wicks 38 being stacked, so that the wicks 38 can be prevented from being bitten by or mixed with . . . the wires 65. As a result, the vapor passage and the liquid passage can be defined without fail.

The whole process is completed by sealing the two open ends of the collapsed flat pipe 41 by welding means or the like, although not shown, and by filling a predetermined amount of pure water as the working fluid in an evacuated state. Incidentally, this step for preparing the heat pipe can adopt the method/means known in the prior art. Since a metal such as copper is used as the materials for the individual components, as described above, there is obtained an advantage that the shaping treatment can be facilitated.

Thus, according to the manufacture method thus far described, it is possible to efficiently prepare the plate heat pipe which is excellent in the heat transfer capacity for cooling the portable personal computer.

Figure 23:
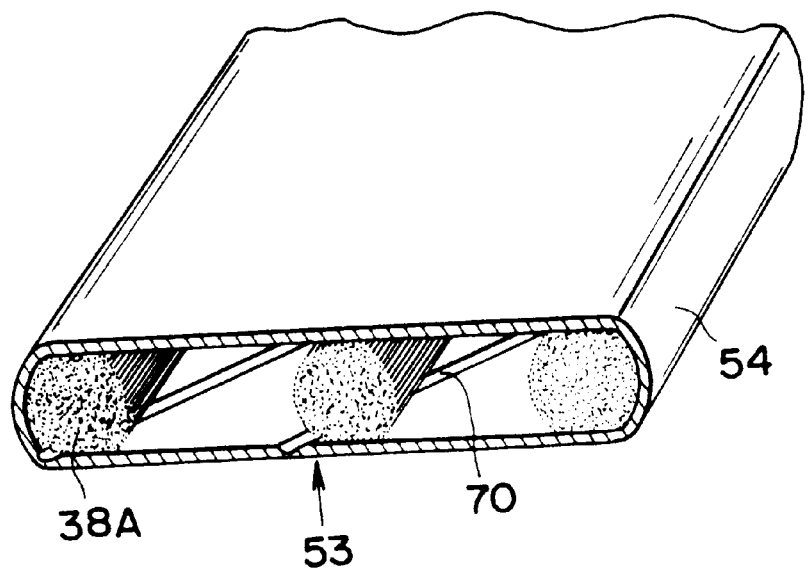
FIG. 23 is a cut-away perspective view showing an internal structure of a plate heat pipe according to a sixth embodiment of the present invention.
Figure 24:
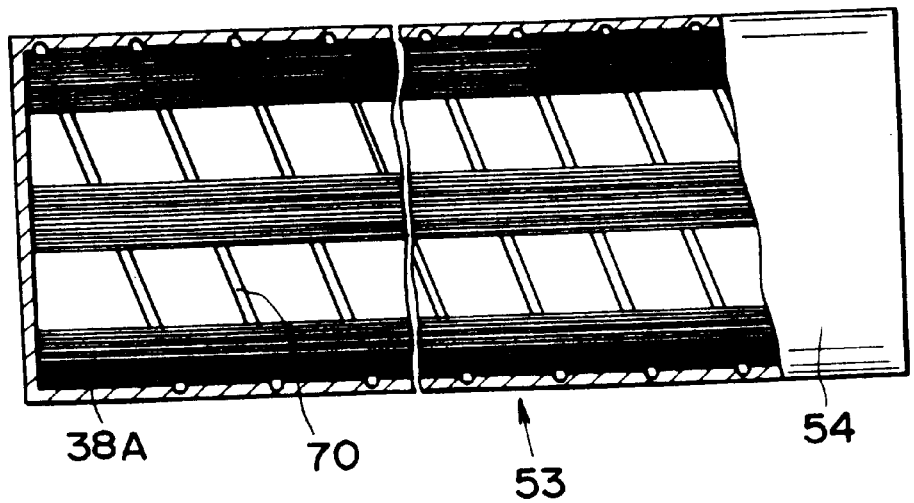
FIG. 24 is a partially cut-away view showing the state in which wicks are arranged in a container in accordance with the sixth embodiment.

In a construction according to a sixth embodiment of the present invention, as shown in FIGS. 23 and 24, wicks 38A are arranged as bundles of extremely thin wires in the longitudinal direction in the container 54. Here are arranged three wick bundles 38A, one of which is arranged generally at the widthwise center of the container 54 whereas the remaining two are arranged in contact with the two sides of the container 54. Moreover, the individual wick bundles 38A are clamped and fixed between the upper and lower faces of the inner wall of the container 54.

Each of these wick bundles 38A is composed of a number of extremely thin copper wires having a diameter of about 0.02 to 0.2 mm and bundled at a predetermined lengthwise interval by the same extremely thin copper wires. The wick bundles 38A can be made lighter if the copper wires are replaced by copper-plated carbon fibers.

The aforementioned container 54 is formed in its inner wall with grooves 70 which are spirally extended in the longitudinal direction. Incidentally, these grooves 70 may be formed exclusively at the two end portions of the container 54. In either event, the grooves 70 individually intersect the wick bundles 38A.

Here will be described the operations of the plate heat pipe 53 according to the sixth embodiment, as shown in FIGS. 23 and 24. First of all, the heat is generated in the MPU 26, as the personal computer body 10 is used. The heat is transmitted to the upper face of the container 54 of the plate heat pipe 53 so that the heat pipe actions are started. Specifically, the vapor is produced in the end portion of the plate heat pipe 53 at the side of the MPU 26 and flows into the gaps between the individual wick bundles 38A and further to the end portion at the side of the chassis 36, which has a lower internal pressure. Thus, the vapor passage is formed between the wick bundles 38A in the container 54. The vapor of the working fluid is condensed as its heat is taken by the wall of the container 54.

Of the plate heat pipe 53, therefore, the end portion arranged on the chassis 36 acts as the condensation portion 35, and the end portion at a higher level at the side of the MPU 26 acts as the evaporation portion 39, so that the plate heat pipe 53 takes the top heat mode.

On the other hand, the working fluid having restored the liquid phase is distributed in the inner circumference of the container 54 along the grooves 70. During this distribution, the liquid comes into any of the wick bundles 38A so that it is sucked and delivered to the evaporation portion 39 by the wick bundles 38A. Thus, these individual wick bundles 38A act as the liquid passages. Since each wick bundle 38A is composed a number of extremely thin copper wires to increase the so-called "pumping force" and arranged in the longitudinal direction of the container 54, the reflux of the working fluid to the upper evaporation portion 39 is ensured.

This reflux is supplied by the working fluid which is delivered in the inner circumference of the container 54 from the individual wick bundles 38A by the capillary pressure to be established in the grooves 70. In short, the working fluid in liquid phase thus returned does not stagnate in the individual wick bundles 38a and locally in the container 54 but is smoothly supplied to the wide range of the evaporation portion 39. As a result, the heat transfer cycle by the working fluid is activated to cool the MPU 26 efficiently.

Thus, the plate heat pipe 53 described above not only has its vapor passage and liquid passage separated and but also has an excellent reflux capacity of the working fluid by the wick bundles 38A. As a result, the various demands such as the size, as required for the heat pipe to cool the portable personal computer, can be satisfied. At the same time, this heat pipe can exhibit an excellent heat transfer capacity in the operations in the top heat mode or in the inclined state. In addition, the capacity of the heat pipe for cooling the MPU 26 can be drastically improved over that of the ordinary plate heat pipe of the prior art. Moreover, both the container 54 and the elements inserted therein are given proper flexibilities so that they can be deformed according to the layout of the heat generating and radiating portions.

Figure 25:
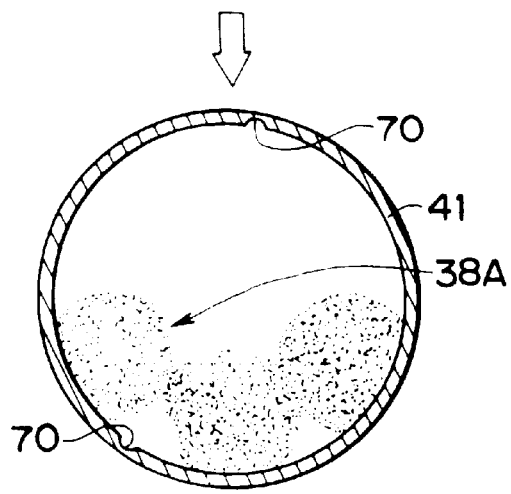
FIG. 25 is a section showing a step of a process for manufacturing a plate heat pipe in accordance with the sixth embodiment.

Here will be described a process for manufacturing the container for the plate heat pipe 53 of the sixth embodiment with reference to FIGS. 25 to 27. As the material for the container 54, there is prepared the pipe 41 having a circular section, which is formed in its inner wall with the longitudinally extending spiral grooves 70. Alternatively, the pipe 41 may be formed with the grooves 70 only in its two end portions. Incidentally, the method of forming the grooves 70 can adopt the well-known means such as the drawing treatment using a mandrel which is formed with a plurality of ridges on its outer circumference.

Next, the three wick bundles 38A prepared to have equal diameters are axially inserted into the pipe 41. At this time, one wick bundle 38A is laid on the bottom of the pipe 41, and the remaining two wick bundles 38A are laid along and at the sides of the former wick bundle 38A, as shown in FIG. 25. Here, the number of the wick bundles 38A is exemplified by three but should not be limited to it.

Figure 26:
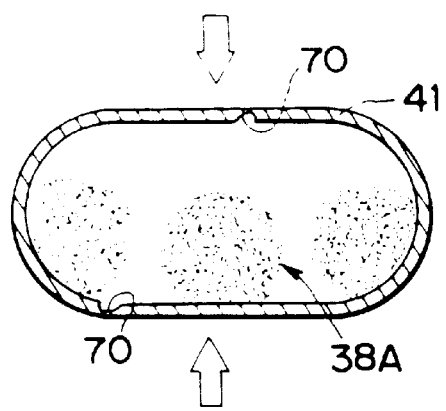
FIG. 26 is a section showing an intermediate state in which the pipe is collapsed in the sixth embodiment.
Figure 27:
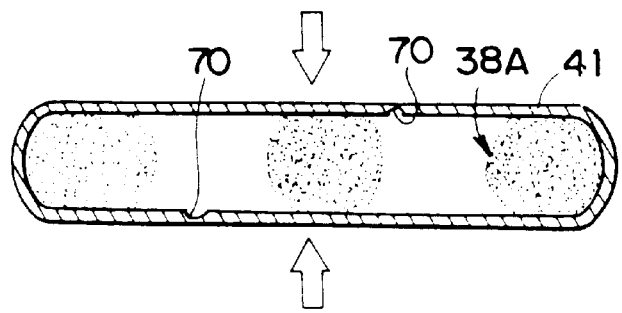
FIG. 27 is a section showing the state in which the pipe collapsing step is ended in the sixth embodiment.

Then, the pipe 41 having the wick bundles 38A inserted is sent to a collapsing step (as shown in FIG. 26). At this step, there can be adopted the method/means known in the prior art. Here, the pipe 41 is laid with its lower side being fixed and is collapsed at its upper portion evenly in the longitudinal direction to such an extent that the individual wick bundles 38A are slightly deformed. Then, one wick bundle 38A is fixed generally at the widthwise center of the container 54, and the remaining two are fixed in contact with the two side walls of the container 54. At this collapsing step, moreover, the pipe 41 is internally supported at its widthwise center portion by the central wick bundle 38A so that the pipe 41 is not longitudinally impressed at the widthwise centers of the upper and lower faces of the pipe 41, as shown in FIG. 27. As a result, the flattened hollow container 54 can be efficiently and reliably prepared.

The whole process is completed by sealing the two open ends of the collapsed flat pipe 41 by welding means or the like, although not shown, and by filling a predetermined amount of pure water as the working fluid in an evacuated state. Incidentally, this step for preparing the heat pipe can adopt the method/means known in the prior art. Since a metal such as copper is used as the materials for the individual components, as described above, there is obtained an advantage that the shaping treatment can be facilitated.

Thus, according to the manufacture method thus far described, it is possible to efficiently prepare the plate heat pipe 53 which is excellent in the heat transfer capacity for cooling the portable personal computer.

Figure 28:
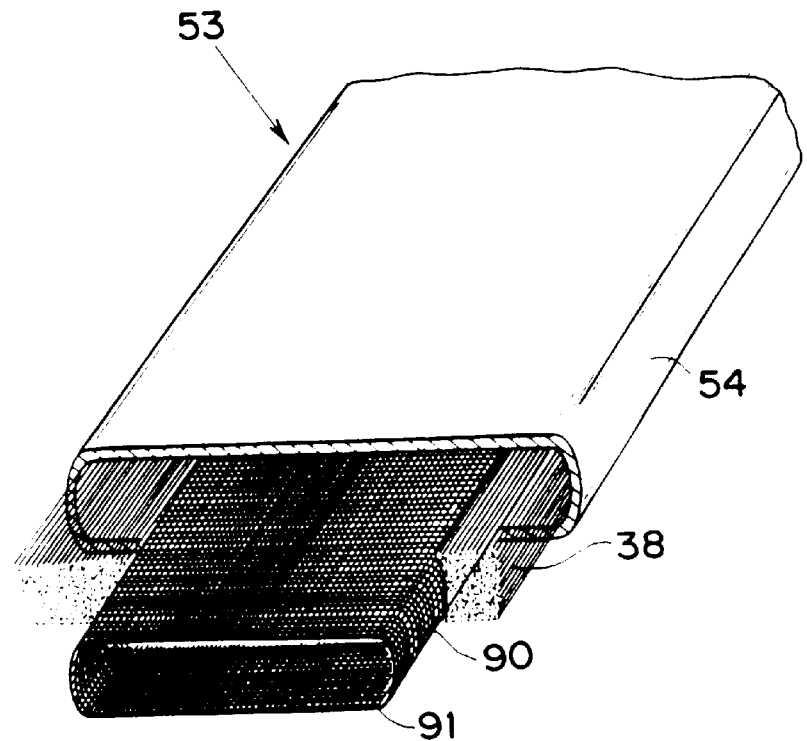
FIG. 28 is a partially cut-away perspective view showing an internal structure of a plate heat pipe in accordance with a seventh embodiment of the present invention.
Figure 29:
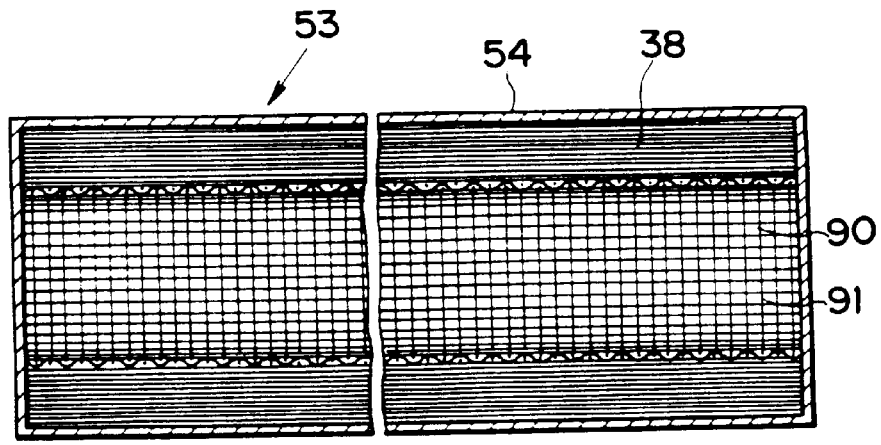
FIG. 29 is a section showing an arranged state in which wicks and a mesh member are arranged in a container in accordance with the seventh embodiment.

According to a construction of a seventh embodiment of the present invention, as shown in FIGS. 28 and 29, a mesh member 90 is arranged as a net structure generally at the widthwise center position in the container 54 and extended in the longitudinal direction of the container 54. The mesh member 90, as used herein, is exemplified by winding a stainless screen of about 100 meshes into a flattened cylindrical shape directly along the upper and lower faces of the inner wall of the container 54.

The spaces in the container 54 at the two sides of the mesh member 90 are filled up with a number of wicks 38 in the longitudinal direction. These wicks 38, as adopted here, are extremely thin copper wires having a diameter of about 0.02 to 0.1 mm. Moreover, the wicks 38 can be made lighter if the copper wires are replaced by copper-plated carbon fibers. Moreover, the wicks 38 are fixed on the side faces of the inner wall of the container 54 while being pushed by the two side faces of the mesh member 90. In other words, the numerous wicks 38 are fixed in position without getting loose by the radial elasticity of the mesh member 90.

Incidentally, it is sufficient that the wicks 38 are arranged in the longitudinal direction while being pushed and fixed on the inner wall of the container 54. Therefore, the mesh member 90 may be offset in the container 54 to leave a space for arranging the wicks 38.

Here will be described the operations of the plate heat pipe 53 according to the seventh embodiment. First of all, the heat is transmitted to the upper face of the container 54 of the plate heat pipe 53 as it is generated in the MPU 26 in accordance with the use of the personal computer body 10. Since the inner wall of the container 54, the wicks 38 and the mesh member 90 have already been wedded with the working fluid, the heat pipe action using the MPU 26 as the heat source is quickly started.

Specifically, the vapor is produced in the end portion of the plate heat pipe 53 at the side of the MPU 26 and flows from the joints 90 of the mesh member 90 into the internal space of the mesh member 90 and further to the other end portion arranged on the chassis 36, which has a lower internal pressure. This means that the vapor passage is formed in the mesh member 90. The vapor of the working fluid comes out of the joints 91 until it is condensed while having its heat taken by the wall of the container 54. In short, the heat generated in the MPU 26 is transmitted from that end portion to the chassis 36.

Of the plate heat pipe 53, the end portion arranged on the chassis 36 provides the condensation portion 35, and the end portion arranged on the MPU 26 provides the evaporation portion 39. In this case, the evaporation portion 39 is positioned at a higher level than that of the condensation portion 35 so that the heat pipe takes the top heat mode. The working fluid having restored the liquid phase is sucked up from the bottom of the container 54 and delivered to the evaporation portion 39 by the wicks 38. Thus, the wicks 38 act as the liquid passage. The wicks 38 are made of a number of extremely thin wires so that the so-called "pumping force" is high, and the wicks 38 are arranged all over the length of the container 54 so that the reflux of the working fluid to the upper evaporation portion 39 is ensured.

This reflux is supplied by the working fluid which is sucked up circumferentially of the mesh member 90 from the wicks 38 and the bottom of the container 54 by the capillary pressure acting upon the joints 91 of the mesh member 90, until it is heated and evaporated. In other words, the working fluid in liquid phase is delivered in the inner circumference of the container 54 and smoothly distributed over the wide range of the evaporation portion 39. As a result, the heat transfer cycle is activated to cool the MPU 26 efficiently.

Thus, the plate heat pipe 53 described above not only has its vapor passage and liquid passage separated and but also has an excellent reflux capacity of the working fluid by the wicks 38. As a result, the various demands such as the size, as required for the heat pipe to cool the portable personal computer, can be satisfied. At the same time, this heat pipe can exhibit an excellent heat transfer capacity in the operations in the top heat mode or in the inclined state. In addition, the capacity of the heat pipe for cooling the MPU 26 can be drastically improved over that of the ordinary plate heat pipe of the prior art. Moreover, both the container 54 and the elements inserted therein are given proper flexibilities so that they can be deformed according to the layout of the heat generating and radiating portions.

Figure 30:
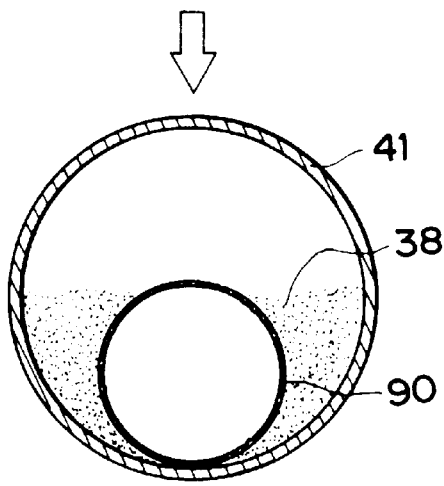
FIG. 30 is a section showing a step of a process for manufacturing the plate heat pipe in accordance with the seventh embodiment and shows the pipe in the state arranged with wicks at the two sides of the mesh member.

Here will be described a process for manufacturing the container for the plate heat pipe according to the seventh embodiment. First of all, the pipe 41 having a circular section is prepared as the material for the container 54, as shown in FIG. 30. This pipe 41 is a copper pipe having a thickness of about 0.4 to 0.5 mm. Next, the mesh member 90, as rolled into a cylindrical shape having an external diameter as large as one half of the pipe 41, is axially inserted into the pipe 41. Incidentally, this mesh member 90 does not have its size and sectional shape limited any more if it is cylindrical, or may be simply rolled to have its edge portions overlapped or fixed by suitable means.

Moreover, the wicks 38 are inserted into the space between that mesh member 90 and the inner wall of the pipe 41. At this time, the pipe 41 is not formed in advance into a flattened shape but is formed into a circular shape providing a relatively large aperture for the insertion. As a result, the wicks 38 made of extremely thin wires having a diameter of about 0.02 to 0.1 mm can be inserted without any trouble even if they are numerous. Incidentally, the insertion order of the wicks 38 and the mesh member 90 may be reversed, and these components are degreased and rinsed before used.

Figure 31:
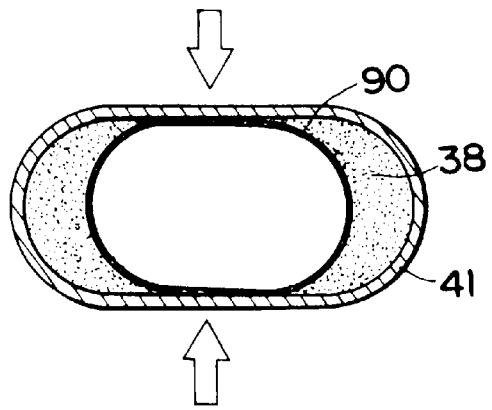
FIG. 31 is a section showing an intermediate state in which the pipe and the mesh member are collapsed in the seventh embodiment.

Next, the pipe 41 having the wicks 38 inserted is sent to a collapsing step (as shown in FIG. 31). At this step, there can be adopted the method/means known in the prior art. For example, the pipe 41 is laid with its lower side being fixed and is collapsed at its upper portion evenly in the longitudinal direction to such an extent that the mesh member 90 has its section deformed into an elliptical shape.

Figure 32:
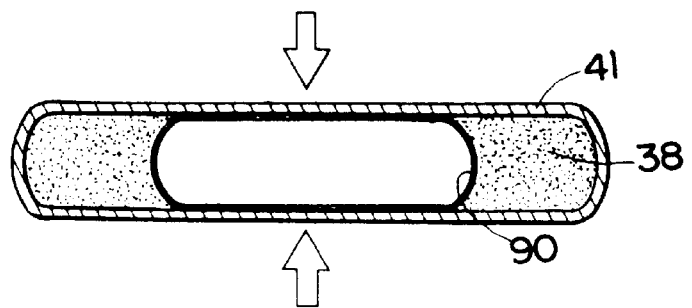
FIG. 32 is a section showing the state in which the pipe collapsing step is ended in the seventh embodiment.
Figure 33:
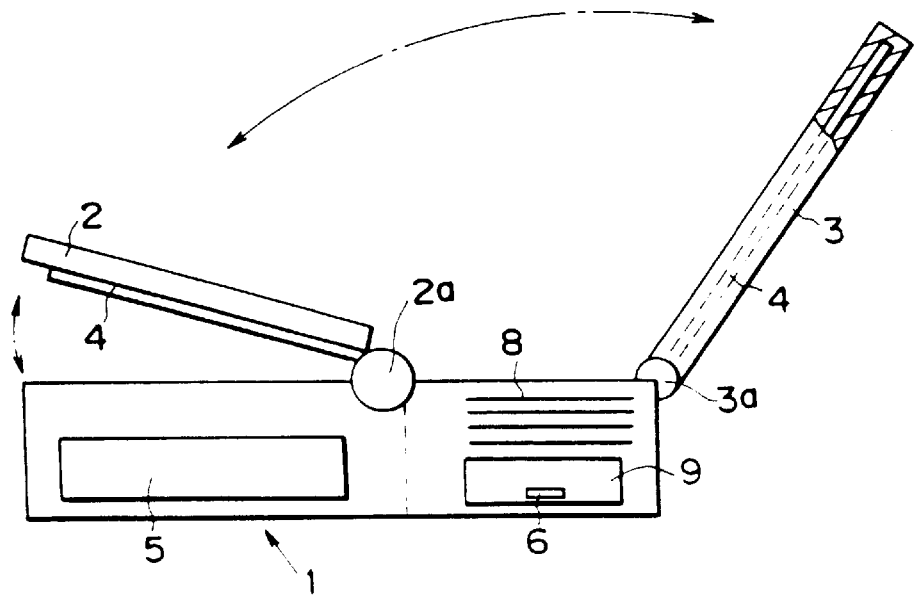
FIG. 33 is a schematic side elevation showing a cooling device of a personal computer of the prior art, as taken from the side of the personal computer body.
Figure 34:
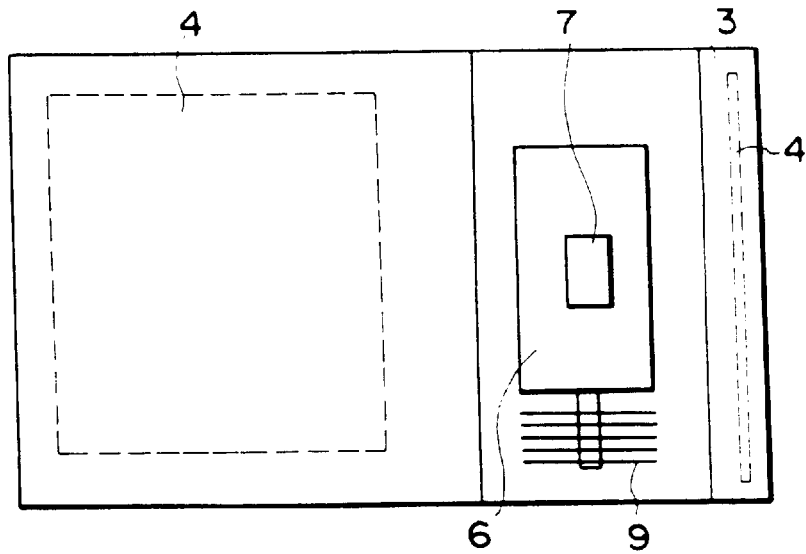
FIG. 34 is a schematic top plan view of the cooling device of the prior art, as taken from the top of the personal computer body.

Then, the wicks 38 are gradually pushed by the two side faces of the mesh member 90 until they are fixed on the side walls 6f the container 54. At this step of collapsing the pipe 41, moreover, the container 54 is supported at its inside by the mesh member 90 having a sufficient elasticity in its radial direction so that the pipe 41 is not longitudinally impressed at the widthwise centers of the upper and lower faces (or flat portions) of the pipe 41, as shown in FIG. 32. Thus, the flattened hollow container 54 can be easily prepared.

The whole process is completed by sealing the two open ends of the collapsed flat pipe 41 by welding means or the like, although not shown, and by filling a predetermined amount of pure water as the working fluid in an evacuated state. Incidentally, this step for preparing the heat pipe can adopt the method/means known in the prior art.

Thus, according to the manufacture method thus far described, it is possible to efficiently prepare the plate heat pipe 53 which is excellent in the heat transfer capacity for cooling the portable personal computer.

What is claimed is:

1. A device for cooling a personal computer which includes a personal computer body having a heat generating electronic element therein, and a display section having a flat screen connected in an openable manner to the personal computer body through a hinge, the device comprising:

a first heat pipe having its one end portion formed into a hollow cylindrical shape so as to construct a part of said hinge, and its other end portion arranged along said display section, where said other end portion of said first heat pipe terminates at said display section; and a second heat pipe for transmitting a heat from said electronic element to said hinge said second heat pipe having its one end portion terminating at, and connected to, said electronic element, where said one end portion of said second heat pipe is connected in a heat transferring manner to said electronic element, and its other end portion is rotatably fitted within, and is connected in a heat transferring manner to said hollow cylindrical portion formed at said one end portion of said first heat pipe, so as to construct said hinge.

* * * * *

UNITED STATES PATENT AND TRADEMARK OFFICE
CERTIFICATE OF CORRECTION

PATENT NO. : 6,122,166
DATED : September 19, 2000
INVENTOR(S) : Masataka Mochizuki, et al.

It is certified that error appears in the above-identified patent and that said Letters Patent is hereby corrected as shown below:

On the title page, Item [54], and at the top of Column 1, the title should be:

---[54] PERSONAL COMPUTER COOLING DEVICE HAVING A HEAT PIPE TRANSMITTING HEAT FROM AN ELECTRONIC ELEMENT THROUGH A HEAT PIPE TO A HEAT RADIATING PORTION ---

On the title page, Item [45], the CPA information has been omitted. Item [45] should read as follows:

--- [45] Date of Patent: *Sep. 19, 2000

[ * ] Notice: This patent issued on a continued prosecution application filed under 37 CFR 1.53(d), and is subject to the twenty year patent term provisions of 35 U.S.C. 154(a)(2).

Signed and Sealed this

Fifteenth Day of May, 2001

*Attest:*

NICHOLAS P. GODICI

*Attesting Officer*     *Acting Director of the United States Patent and Trademark Office*